(12) United States Patent
Weston et al.

(10) Patent No.: US 9,162,149 B2
(45) Date of Patent: Oct. 20, 2015

(54) INTERACTIVE ENTERTAINMENT SYSTEMS AND METHODS

(71) Applicant: MQ GAMING, LLC, Irvine, CA (US)

(72) Inventors: Denise Chapman Weston, Wakefield, RI (US); Jonathan A. Barney, Newport Beach, CA (US)

(73) Assignee: MQ Gaming, LLC, Irvine, CA (US)

( * ) Notice: Subject to any disclaimer, the term of this patent is extended or adjusted under 35 U.S.C. 154(b) by 0 days.

(21) Appl. No.: 14/479,222

(22) Filed: Sep. 5, 2014

(65) Prior Publication Data

US 2014/0378233 A1    Dec. 25, 2014

Related U.S. Application Data

(63) Continuation of application No. 13/209,087, filed on Aug. 12, 2011, now Pat. No. 8,827,810, which is a continuation of application No. 11/507,934, filed on Aug. 22, 2006, now abandoned, which is a (Continued)

(51) Int. Cl.
*A63F 13/323*     (2014.01)
*A63F 13/40*      (2014.01)
(Continued)

(52) U.S. Cl.
CPC .............. *A63F 13/323* (2014.09); *A63F 13/10* (2013.01); *A63F 13/12* (2013.01); *A63F 13/235* (2014.09); *A63F 13/98* (2014.09); *A63H 30/04* (2013.01); *A63H 33/009* (2013.01); *A63J 21/00* (2013.01); *G06Q 30/02* (2013.01);
(Continued)

(58) Field of Classification Search
CPC .............................. A63F 13/10; G06K 7/0008
See application file for complete search history.

(56) References Cited

U.S. PATENT DOCUMENTS 4,776,253 A    10/1988  Downes
4,837,568 A    6/1989   Snaper et al.
(Continued)

FOREIGN PATENT DOCUMENTS

CN    2113224 U    2/1992
GB    2307133      5/1997
(Continued)

OTHER PUBLICATIONS

"HyperScan", release date Oct. 2006. Source http://www.giantbomb.com/hyperscan/3045-1 041.

(Continued)

*Primary Examiner* — William A Brandenburg
(74) *Attorney, Agent, or Firm* — Knobbe, Martens, Olson & Bear, LLP

(57) ABSTRACT

Methods are described for selling, loaning, renting, or otherwise providing a retail product, such as an interactive product, that allows a consumer to participate in one or more venues. The retail product is capable of interfacing with interactive devices in the venues that are capable of producing sensory effects based on communication from and/or to the retail product. Furthermore, the retail product preferably has an independent or intrinsic value apart from the use of the product in the venues, and may include, for example, a toy wand or like toy device, apparel, and/or jewelry. In certain examples, the retail methods include tracking the consumer's use of the retail product in the venue(s). Such tracking information may be used to customize the experience of the user during a subsequent visit to the same venue or another venue.

20 Claims, 16 Drawing Sheets

Related U.S. Application Data continuation-in-part of application No. 11/183,592, filed on Jul. 18, 2005, now Pat. No. 8,608,535, which is a continuation of application No. 10/410,583, filed on Apr. 7, 2003, now Pat. No. 6,967,566.

(60) Provisional application No. 60/370,568, filed on Apr. 5, 2002.

(51) Int. Cl.
*A63H 30/04* (2006.01)
*A63H 33/00* (2006.01)
*A63J 21/00* (2006.01)
*G06Q 30/02* (2012.01)
*A63F 13/30* (2014.01)
*A63F 13/235* (2014.01)
*A63F 13/98* (2014.01)
*A63F 3/00* (2006.01)

(52) U.S. Cl.
CPC .... *A63F 3/00145* (2013.01); *A63F 2300/1025* (2013.01); *A63F 2300/1043* (2013.01); *A63F 2300/201* (2013.01); *A63F 2300/206* (2013.01); *A63F 2300/636* (2013.01); *A63F 2300/69* (2013.01); *A63F 2300/807* (2013.01); *A63H 2200/00* (2013.01)

(56) References Cited

U.S. PATENT DOCUMENTS

| | | | |
|---|---|---|---|
| 5,392,613 A | | 2/1995 | Bolton et al. |
| 5,629,981 A * | | 5/1997 | Nerlikar ................ 713/168 |
| 5,742,233 A | | 4/1998 | Hoffman et al. |
| 6,127,928 A | | 10/2000 | Issacman et al. |
| 6,352,478 B1 * | | 3/2002 | Gabai et al. ................ 463/42 |
| 6,424,264 B1 | | 7/2002 | Giraldin et al. |
| 6,634,949 B1 * | | 10/2003 | Briggs et al. ................ 463/42 |
| 6,747,562 B2 | | 6/2004 | Giraldin et al. |
| 6,891,469 B2 | | 5/2005 | Engellenner |
| 7,038,661 B2 | | 5/2006 | Wilson et al. |
| 7,394,459 B2 | | 7/2008 | Bathiche et al. |
| 8,686,579 B2 | | 4/2014 | Barney et al. |
| 8,702,515 B2 | | 4/2014 | Weston et al. |
| 8,708,821 B2 | | 4/2014 | Barney et al. |
| 8,711,094 B2 | | 4/2014 | Barney et al. |
| 8,753,165 B2 | | 6/2014 | Weston |
| 8,758,136 B2 | | 6/2014 | Briggs et al. |
| 8,795,079 B2 | | 8/2014 | Penzias, III |
| 8,814,688 B2 | | 8/2014 | Barney et al. |
| 8,834,271 B2 | | 9/2014 | Ikeda |
| 8,870,655 B2 | | 10/2014 | Ikeda |
| 8,888,576 B2 | | 11/2014 | Briggs et al. |
| 8,913,011 B2 | | 12/2014 | Barney et al. |
| 8,915,785 B2 | | 12/2014 | Barney et al. |
| 8,961,260 B2 | | 2/2015 | Weston |
| 2001/0031652 A1 | | 10/2001 | Gabai et al. |
| 2003/0149803 A1 | | 8/2003 | Wilson et al. |
| 2004/0043806 A1 | | 3/2004 | Kirby et al. |
| 2004/0198158 A1 * | | 10/2004 | Driscoll et al. ................ 446/297 |
| 2005/0110751 A1 | | 5/2005 | Wilson et al. |
| 2013/0116020 A1 | | 5/2013 | Barney et al. |
| 2013/0303276 A1 | | 11/2013 | Weston et al. |
| 2014/0194206 A1 | | 7/2014 | Barney et al. |
| 2014/0235341 A1 | | 8/2014 | Barney et al. |
| 2014/0256446 A1 | | 9/2014 | Barney et al. |
| 2014/0323221 A1 | | 10/2014 | Ikeda |
| 2014/0357373 A1 | | 12/2014 | Barney et al. |
| 2014/0378233 A1 | | 12/2014 | Weston et al. |

FOREIGN PATENT DOCUMENTS

| | | |
|---|---|---|
| JP | 06-154422 | 6/1994 |
| JP | 06-190144 | 7/1994 |
| JP | 06-308879 | 11/1994 |
| JP | 2000-325653 | 11/2000 |
| JP | 2003-236246 | 8/2003 |

OTHER PUBLICATIONS

"Smart Card News Online", published Oct. 25, 2006, source www.smartcard.co.ukINOLARCH/2006/October/251006.html.

*Creative Kingdoms LLC v. ITC*, The United States Court of Appeals for the Federal Circuit, No. 2014-1072, dated Dec. 19, 2014.

Donelson, et al., "Spatial Management of Information", Proceedings of 1978 ACM SIGGRAPH Conference in Atlanta, Georgia, pp. 203-209 (Aug. 1977).

Druin et al., Robots: Exploring New Technologies for Learning for Kids; 2000; Chapter One: To Mindstorms and Beyond; 27 pages (Jun. 2000).

Durlach, et al., "Virtual Reality: Scientific and Technological Challenges," National Academy Press (Dec. 1994).

Geen et al., "New iMEMS® Angular-Rate-Sensing Gyroscope," Analog Dialogue 37-03, pp. 12-14 (2003).

Owl Magic Wand & Owl Magic Orb Raving Toy Maniac, Nov. 19, 2001. [online] [retrieved on Mar. 30, 2005], Retrieved from the Internet (URL:http://www.toymania.com/news/messages/1358.shtml).

* cited by examiner

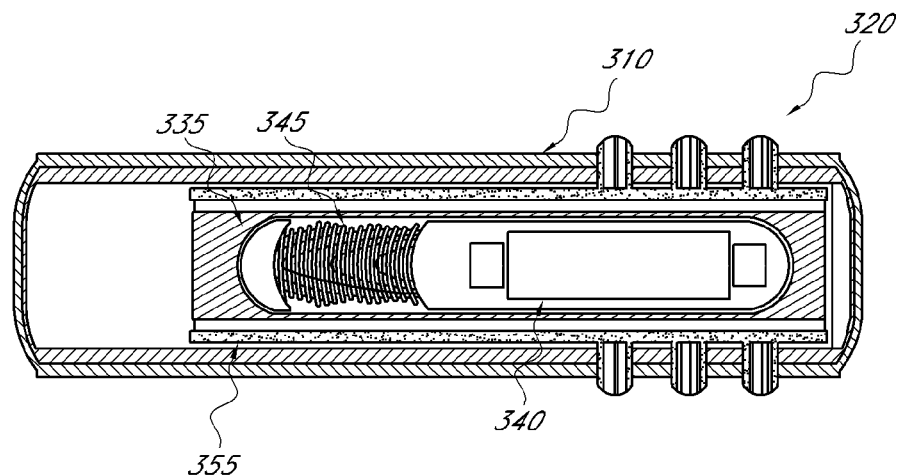
FIG. 17C
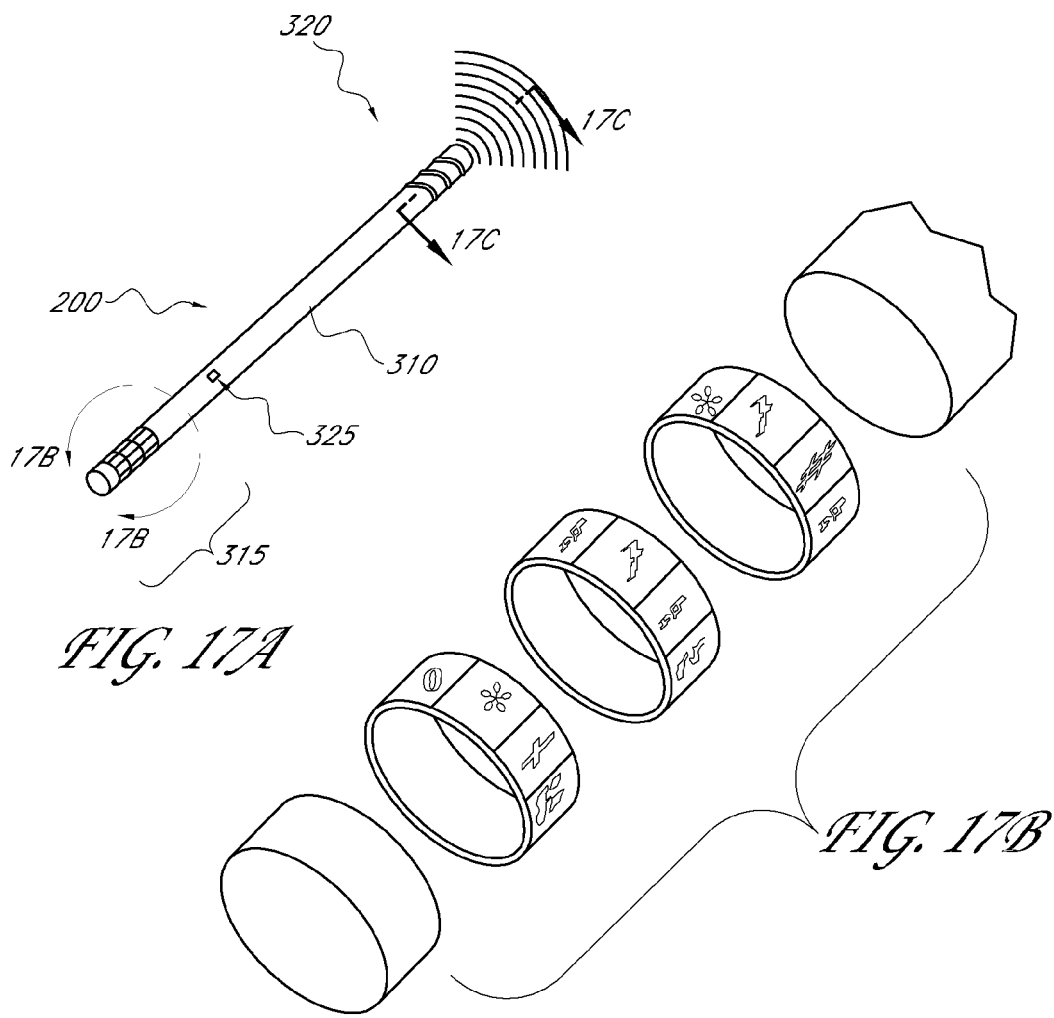
FIG. 17A
FIG. 17B

INTERACTIVE ENTERTAINMENT SYSTEMS AND METHODS

RELATED APPLICATIONS

This application is a continuation of and claims priority benefit under 35 U.S.C. §120 from U.S. patent application Ser. No. 13/209,087, filed Aug. 12, 2011, now U.S. Pat. No. 8,827,810, which is a continuation of and claims priority benefit under 35 U.S.C. §120 from U.S. patent application Ser. No. 11/507,934, filed Aug. 22, 2006, which is a continuation-in-part of and claims priority benefit under 35 U.S.C. §120 from U.S. patent application Ser. No. 11/183,592, filed Jul. 18, 2005, now U.S. Pat. No. 8,608,535, which is a continuation of and claims benefit of priority under 35 U.S.C. §120 of U.S. patent application Ser. No. 10/410,583, filed Apr. 7, 2003, now U.S. Pat. No. 6,967,566, issued Nov. 22, 2005, which claims priority under 35 U.S.C. §119(e) to U.S. Provisional Application No. 60/370,568, filed Apr. 5, 2002, each of which is hereby incorporated herein by reference in its entirety as if set forth herein and is to be considered a part of this specification.

BACKGROUND OF THE INVENTION

1. Field of the Invention

Embodiments of the present invention relate to providing a retail product to a consumer and, in particular, to methods for providing a retail product for interfacing with interactive devices in one or more venues.

2. Description of the Related Art

Games, play structures and other similar entertainment systems are well known for providing play and interaction among children and adults. A wide variety of commercially available play toys and games are also known for providing valuable learning and entertainment opportunities for children, such as role playing, reading, memory stimulation, tactile coordination and the like.

However, there is always a demand for more exciting and entertaining games and toys that increase the learning and entertainment opportunities for children and stimulate creativity and imagination.

SUMMARY OF THE INVENTION

The present invention provides a unique system and method of multi-media game play carried out utilizing an interactive "wand" and/or other tracking/actuation device to allow play participants to electronically and "magically" interact with their surrounding play environment(s). The play environment may either be real or imaginary (i.e. computer/TV generated), and either local or remote, as desired. Optionally, multiple play participants, each provided with a suitable "wand" and/or tracking device, may play and interact together, either within or outside one or more play environments, to achieve desired goals or produce desired effects within the play environment.

In accordance with one embodiment the present invention provides an interactive play system and wand toy for enabling a trained user to electronically send and receive information to and from other wand toys and/or to and from various transceivers distributed throughout a play facility and/or connected to a master control system. The toy wand or other seemingly magical object is configured to use a send/receive radio frequency communication (SRRF) protocol which provides a basic foundation for a complex, interactive entertainment system to create a seemingly magic interactive play experience for play participants who possess and learn to use the magical wand toy.

In accordance with another embodiment the present invention provides an interactive play structure in the theme of a "magic" training center for would-be wizards in accordance with the popular characters and storylines of the children's' book series "Harry Potter" by J. K. Rowling. Within the play structure, play participants learn to use a "magic wand" and/or other tracking/actuation device. The wand allows play participants to electronically and "magically" interact with their surrounding play environment simply by pointing or using their wands in a particular manner to achieve desired goals or produce desired effects within the play environment. Various receivers or transceivers are distributed throughout the play structure to facilitate such interaction via wireless communications.

In accordance with another embodiment the present invention provides a wand actuator device for actuating various interactive play effects within a radio frequency identification (RFID) compatible play environment. In certain embodiments, the wand comprises an elongated hollow pipe or tube having a proximal end or handle portion and a distal end or transmitting portion. An internal cavity may be provided to receive one or more batteries to power optional lighting, laser or sound effects and/or to power long-range transmissions such as via an infrared light emitting diode (LED) transmitter device or RF transmitter device. The distal end of the wand is fitted with an RFID transponder that is operable to provide relatively short-range radio frequency (RF) communications (for example, less than 60 centimeters) with one or more receivers or transceivers distributed throughout a play environment. The handle portion of the wand is fitted with optional combination wheels having various symbols and/or images thereon which may be rotated to produce a desired pattern of symbols required to operate the wand or achieve one or more special effects.

In accordance with another embodiment the present invention provides an RFID card or badge intended to be affixed or adhered to the front of a shirt or blouse worn by a play participant while visiting an RF equipped play facility. The badge comprises a paper, cardboard or plastic substrate having a front side and a back side. The front side may be imprinted with graphics, photos, or any other information desired. The front side may include any number of other designs or information pertinent to its application. The obverse side of the badge contains certain electronics comprising a radio frequency tag pre-programmed with a unique person identifier number (UPIN). The UPIN may be used to identify and track individual play participants within the play facility. Optionally, each tag may also include a unique group identifier number (UGIN) which may be used to match a defined group of individuals having a predetermined relationship.

In accordance with another embodiment the present invention provides an electronic treasure hunt game. Game participants receive a card, map and/or identification badge configured with an RFID tag, bar-code or a magnetic "swipe" strip or the like. The RFID tag or other identifying device is used to store certain information identifying each play participant and/or describing certain powers or abilities possessed by of an imaginary role-play character that the card represents. Players advance in the game by finding clues and solving various puzzles presented. Players may also gain (or lose) certain attributes, such as magic skills, magic strength, fighting ability, various spell-casting abilities, etc. All of this information is preferably stored on the RFID tag or card so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Certain embodiments of the invention include a method of providing a retail product to a consumer. The method comprises: (i) providing a first interactive device in a first venue, the first interactive device being capable of producing a first sensory response: (ii) providing a second interactive device in a second venue, the second interactive device being capable of producing a second sensory response, wherein the second venue differs from the first venue; (iii) providing to a consumer a retail product capable of interfacing in the first venue with the first interactive device to cause the first sensory response and in the second venue with the second interactive device to cause the second sensory response, the retail product further comprising an intrinsic value that is independent of a use of the retail product by the consumer in the first or second venues; and (iv) tracking the use of the retail product by the consumer in the first or second venues. For example, the retail product may comprise at least one of a toy, apparel and a collector's item, and/or the first venue may comprise at least one of an entertainment or leisure facility, a restaurant, and a hotel.

Certain embodiments of the invention also include another method for providing interactive entertainment. The method comprises: (i) providing a first interactive device in a first venue, the first interactive device configured to produce a first sensory response; (ii) providing a second interactive device in a second venue, the second interactive device configured to produce a second sensory response, wherein the second venue differs from the first venue; (iii) providing to a consumer a retail product configured to generate a first wireless signal to interface in the first venue with the first interactive device to cause the first sensory response, the retail product being further configured to generate a second wireless signal in the second venue with the second interactive device to cause the second sensory response; and (iv) tracking the use of the retail product by the consumer in the first or second venues. In certain embodiments, the first and/or second wireless signal may comprise an RF signal, an infrared signal, a laser, combinations of the same or the like.

In certain embodiments, a method is disclosed for providing an interactive toy to a consumer for use in a variety of different environments. The method comprises: (i) providing an interactive toy to a consumer, wherein the interactive toy comprises a stand-alone value independent of a use of the interactive toy with other objects; (ii) providing a first reader device in a first entertainment facility, the first reader device being capable of electrically interfacing with the interactive toy to produce a first sensory response; (iii) providing a second reader device in a second facility, the second reader device being capable of electrically interfacing with the interactive toy to produce a second sensory response, wherein the second facility is distinct from the first entertainment facility; and (iv) electronically tracking the use of the interactive toy in at least one of the first entertainment facility and the second facility.

In certain embodiments, another method is disclosed for providing interactive entertainment. The method includes: (i) providing an interactive toy to a consumer; (ii) providing a first reader device in a first entertainment facility, the first reader device configured to electrically interface with the interactive toy to produce a first sensory response; (iii) providing a second reader device in a second facility, the second reader device configured to electrically interface with the interactive toy to produce a second sensory response, wherein the second facility is distinct from the first entertainment facility; and (iv) electronically tracking the use of the interactive toy in at least one of the first entertainment facility and the second facility.

In certain embodiments, a method is disclosed for marketing a retail product to a consumer. The method includes: (i) providing at least one interactive device in a venue, the at least one interactive device configured to produce at least one effect; (ii) providing to a consumer a retail product capable of wirelessly interfacing in the venue with the at least one interactive device to trigger the at least one effect, the retail product comprising an intrinsic value that is independent of a use of the retail product by the consumer in the venue; (iii) allowing the consumer to use the retail product in the venue for a period of time; and (iv) offering for sale, after the period of time, the retail product to the consumer.

In yet other embodiments of the invention, a method is disclosed for marketing a retail product to a consumer. The method comprises: (i) providing at least one interactive device in a venue, the at least one interactive device configured to produce at least one effect; (ii) providing to a consumer a retail product configured to generate a wireless signal to interface in the venue with the at least one interactive device to trigger the at least one effect, the retail product comprising an intrinsic value that is independent of a use of the retail product by the consumer in the venue; (iii) allowing the consumer to use the retail product in the venue for a period of time; and (iv) offering for sale, after the period of time, the retail product to the consumer.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 17A is a perspective view of a magic wand toy for use with an interactive adventure game having features and advantages in accordance with the present invention;

FIG. 17B is a partially exploded detail view of the proximal end or handle portion of the magic wand toy of FIG. 17A, illustrating the optional provision of combination wheels having features and advantages in accordance with the present invention;

FIG. 17C is a partial cross-section detail view of the distal end or transmitting portion of the magic wand toy of FIG. 17A, illustrating the provision of an RF transponder device therein;

FIG. 23, which includes

DETAILED DESCRIPTION OF THE PREFERRED EMBODIMENTS

Basic Game Play

In one preferred embodiment the invention provides a system and method of multi-media game play carried out using one or more interactive "wands" and/or other tracking/actuation devices which allow play participants to electronically and "magically" interact with their surrounding play environment(s). The play environment may either be real or imaginary (i.e. computer/TV generated), and either local or remote, as desired. Optionally, multiple play participants, each provided with a suitable "wand" and/or tracking device, may play and interact together, either within or outside one or more play environments, to achieve desired goals or produce desired effects within the play environment For example, the invention may be carried out as an electronic treasure hunt game. Game participants receive a card, map and/or identification badge configured with an RFID tag, bar-code or a magnetic "swipe" strip or the like. The RFID tag or other identifying device is used to store certain information identifying each play participant and/or describing certain powers or abilities possessed by of an imaginary role-play character that the card represents. Players advance in the game by finding clues and solving various puzzles presented. Players may also gain (or lose) certain attributes, such as magic skills, magic strength, fighting ability, various spell-casting abilities, etc. All relevant game information is preferably stored (or addressably identified) on the RFID tag or card so that the character attributes may be easily and conveniently transported to other similarly-equipped play facilities, computer games, video games, home game consoles, hand-held game units, and the like. In this manner, the game is able to seamlessly transcend from one play or entertainment medium the next.

Figure 1:
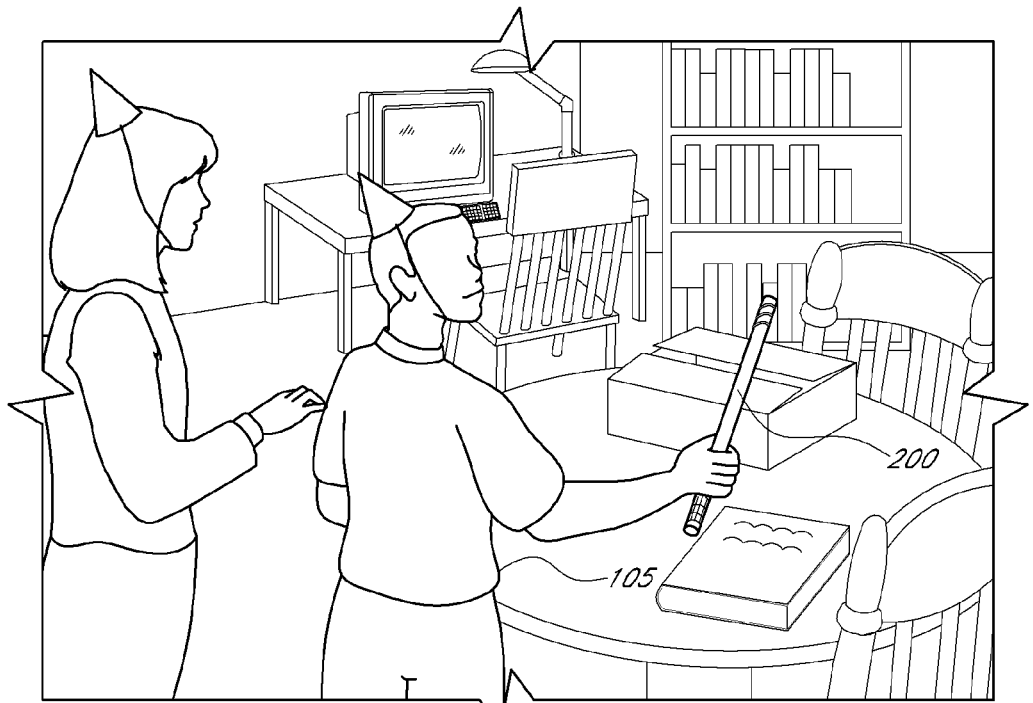
FIG. 1 is a perspective view of a play participant holding an interactive wand for playing an interactive adventure game in accordance with the present invention.

FIG. 1 illustrates one embodiment of an interactive treasure hunt game having features and advantages of the present invention. The particular game illustrated takes on the theme of the popular characters and storylines of the children's' book series "Harry Potter" by J. K. Rowling. Within the game, play participants 105 learn to use a "magic "wand" 200 and/or other tracking/actuation device. The wand 200 (described in more detail later) allows play participants to electronically and "magically" interact with their surrounding play environment simply by pointing or using their wands in a particular manner to achieve desired goals or produce desired effects within the play environment. FIG. 1 shows a play participant 105 receiving a wand 200 and game directions as a gift, for example. In yet other embodiments, and as described in more detail below, the play participant 105 may purchase the wand 200, and/or the wand 200 may be loaned, rented, or otherwise provided to the play participant 105.

Figure 2:
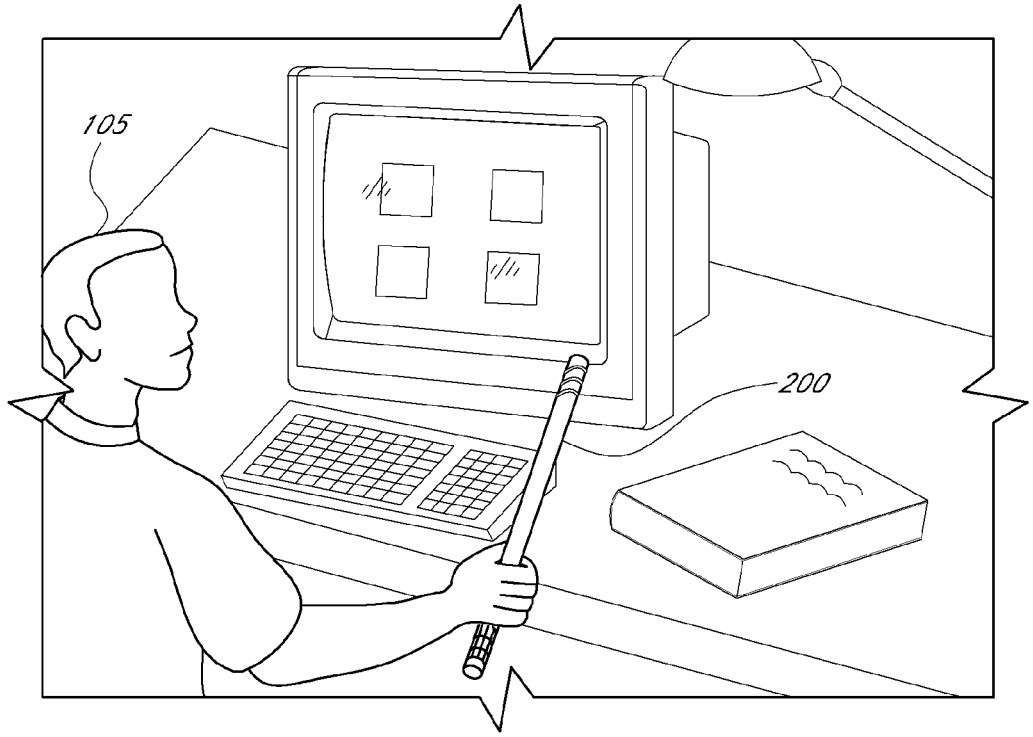
FIG. 2 is a perspective view of a play participant learning to use the interactive wand of FIG. 1 using a computer game and a training manual.

Once the play participant becomes generally familiar with the wand 200 and the game, he or she can preferably access a web site through the world wide web in order to register the wand and play the first interactive treasure hunt game (see, e.g., FIG. 2). Preferably this is a relatively simple game intended to provide a basic training session. In this on-line game session, the player learns how to use the wand to cast spells, levitate objects, open and close doors, etc. within an interactive computer-gaming environment provided by an ordinary home computer 110. The player also learns how to discover important clues needed to advance in the game and to solve various puzzles or challenges presented by the game.

Figure 3:
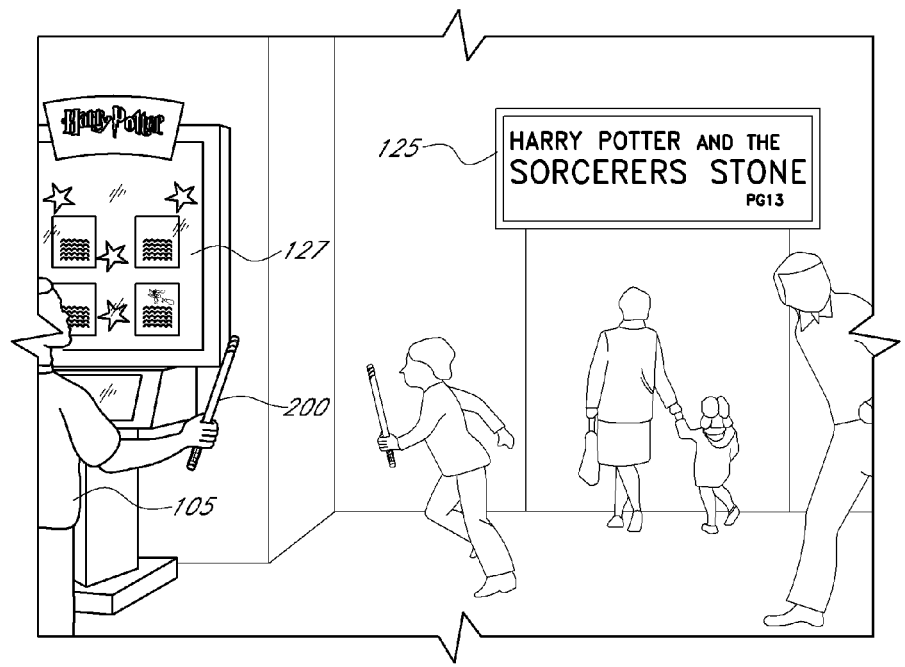
FIG. 3 is a perspective view of an adventure game center provided within a movie theatre configured to facilitate interactive game play in accordance with the present invention.
Figure 4:
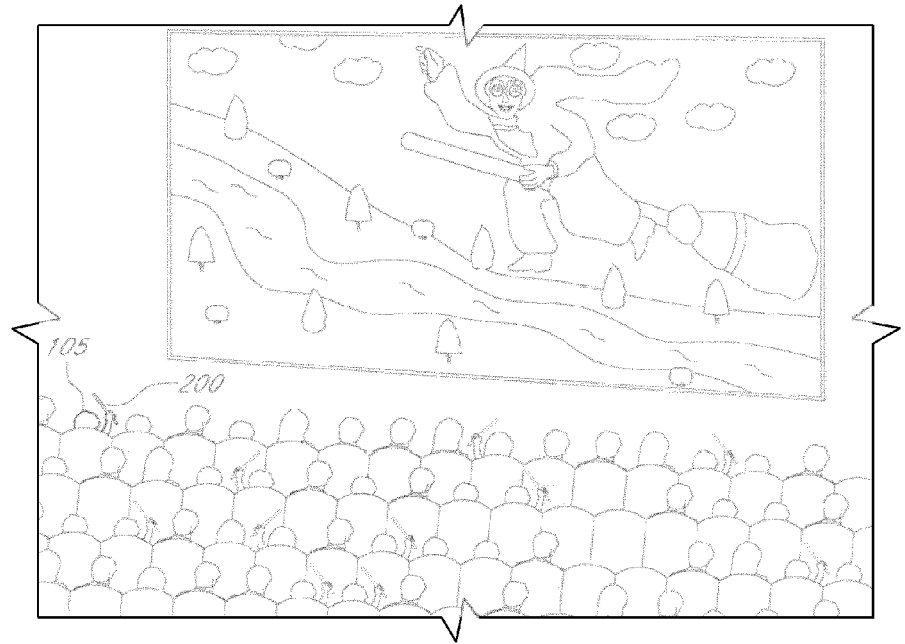
FIG. 4 is a perspective view illustrating how play participants can use the wand of FIG. 1 to create an interactive experience within a movie theatre.

Once the play participant 105 has mastered the basic game and successfully completed the various training sessions, he or she is ready to join other players in a world-wide multi-media gaming adventure. The adventure may begin with a new movie release. For example, FIG. 3 illustrates play participants entering a movie theater to enjoy a newly released Harry Potter movie. Preferably, play participants 105 take their wands 200 into one or more movie venues 125 in order to score points, learn clues and advance in the game. For example, a special check-in booth 127 may be provided within the movie venue for allowing play participants to use their wands 200 to receive clues, special powers and/or points. While watching the movie (see, e.g., FIG. 4), the movie storyline itself may reveal additional clues that will help carefully observant players to advance in the game later. Various clues may also be hidden within otherwise unnoticeable backgrounds, scenery, characters, movie credits, etc. Thus, play participants may need to view a movie multiple times to glean all of the available clues needed to complete the game. Optionally, at certain points in the movie play participants may be able to use their wands 200 or other similar devices to help direct the story-line progression, change to alternate plots, endings, etc. This may be conveniently achieved using any one or more suitable RFID communications protocols and interactive digital DVD technologies (described in more detail later).

Figure 5:
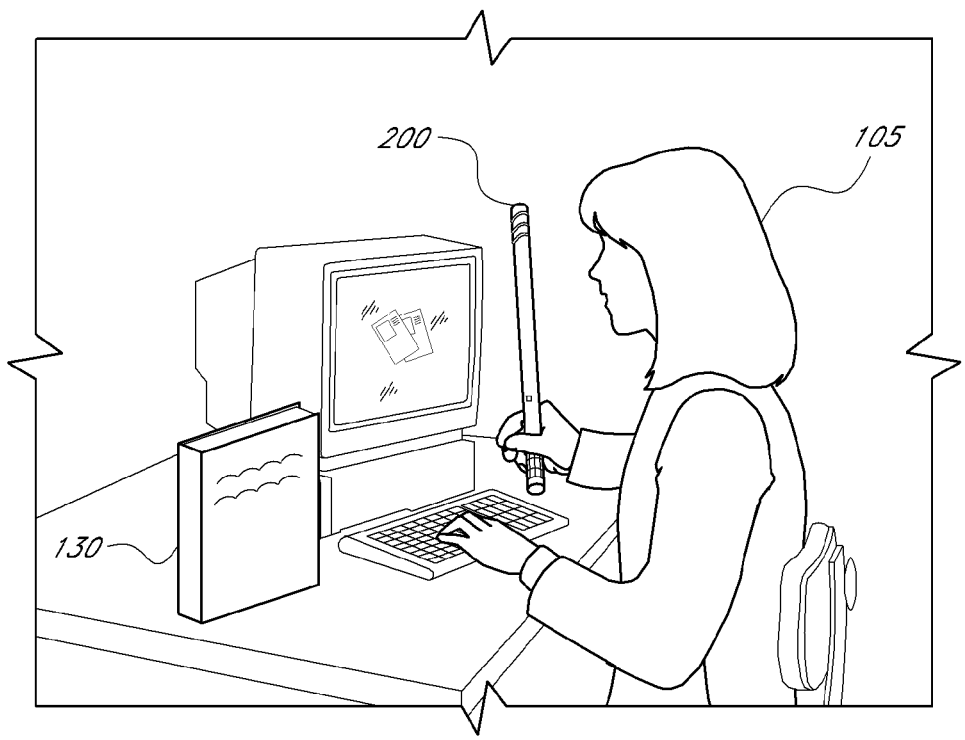
FIG. 5 is a perspective view of a play participant playing an interactive adventure game using a computer and the wand device of FIG. 1.
Figure 7:
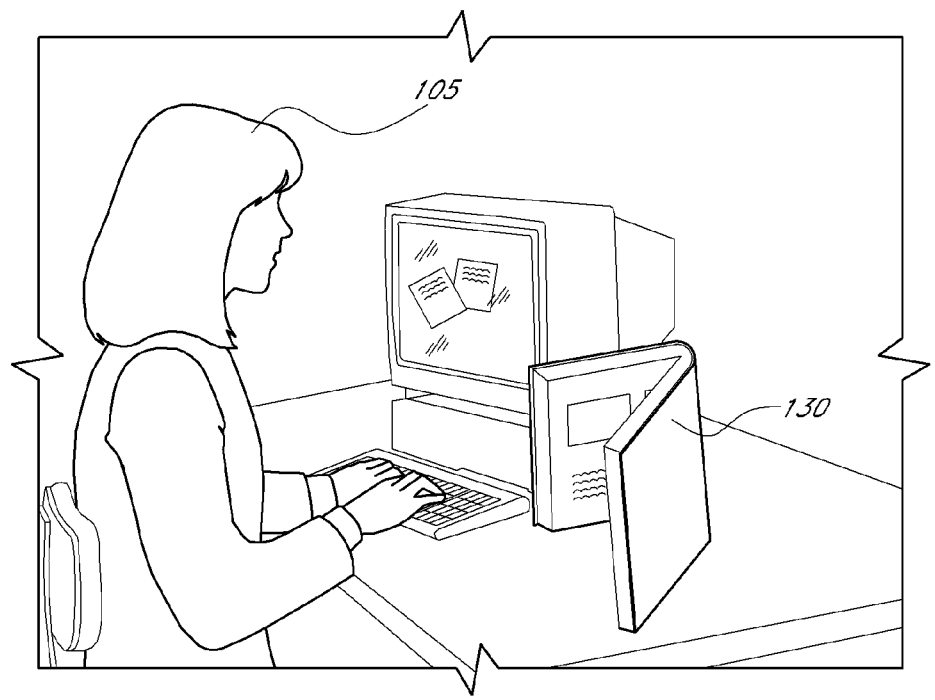
FIG. 7 is a perspective view of a play participant playing an interactive adventure game in accordance with the present invention, and illustrating the use of an extrinsic clue or information source.

Back at home, play participants 105 may use their wand 200 to continue playing the adventure game within one or more available on-line gaming environments (see, e.g., FIG. 5). Various books 130, aids, instructions and other similar materials may be provided to help play participants complete the adventure, while preferably learning valuable knowledge and skills. For example, part of the game play may require play participants to conduct independent research in a particular area or to become proficient in a chosen skill to advance in the game (e.g., FIG. 7).

Figure 6:
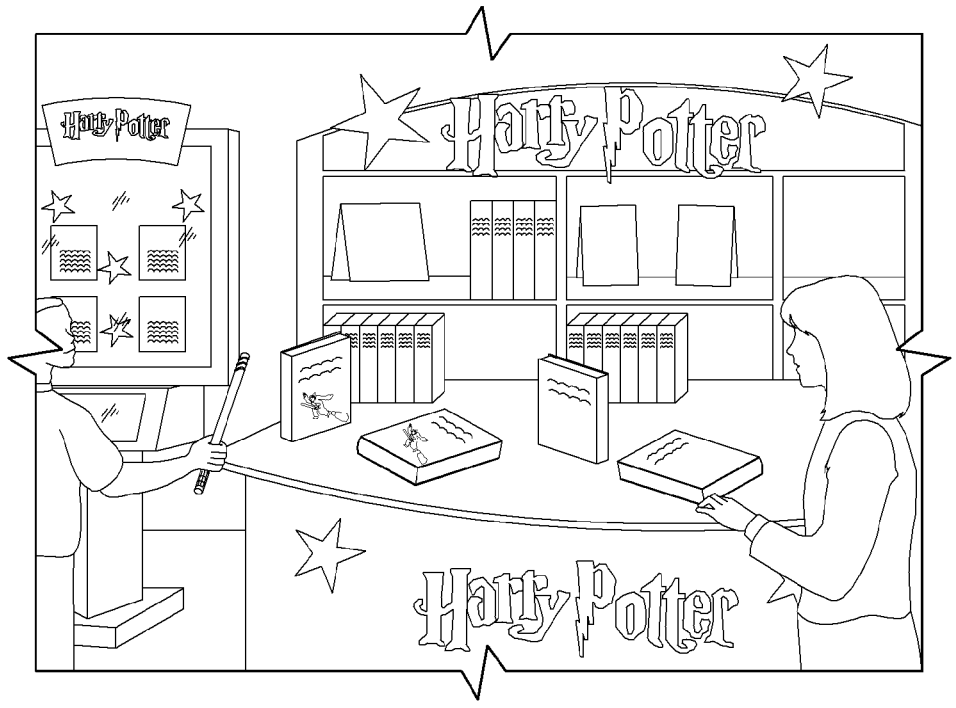
FIG. 6 is a perspective view of an interactive adventure game center having features of the present invention.
Figure 8:
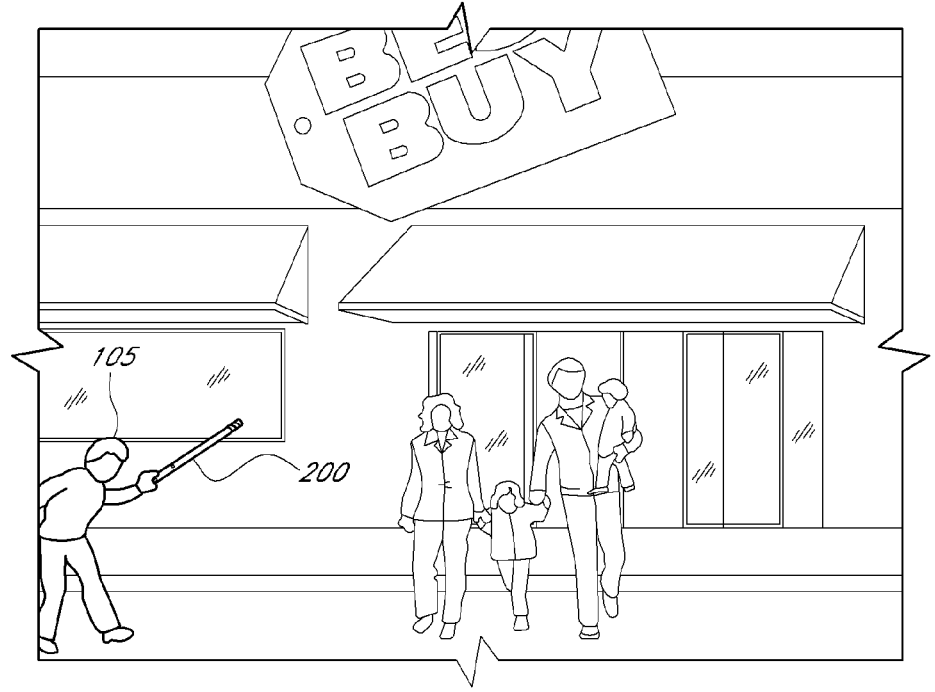
FIG. 8 is a perspective view of a retail store facility having an interactive adventure game center in accordance with the present invention.
Figure 9:
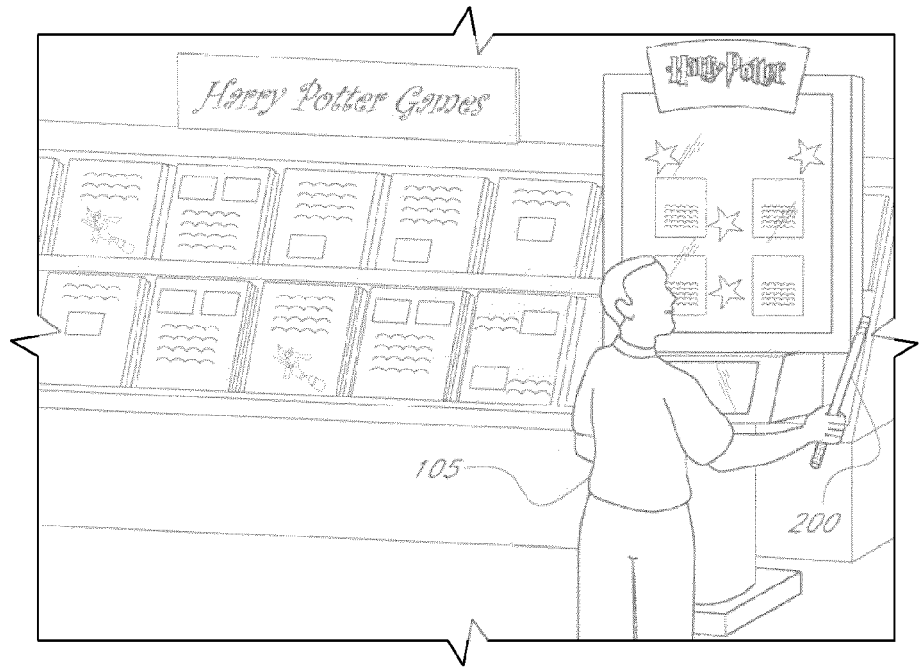
FIG. 9 is a perspective view of an alternative embodiment of an interactive adventure game center provided within the retail store of FIG. 8 and having features of the present invention.
Figure 10:
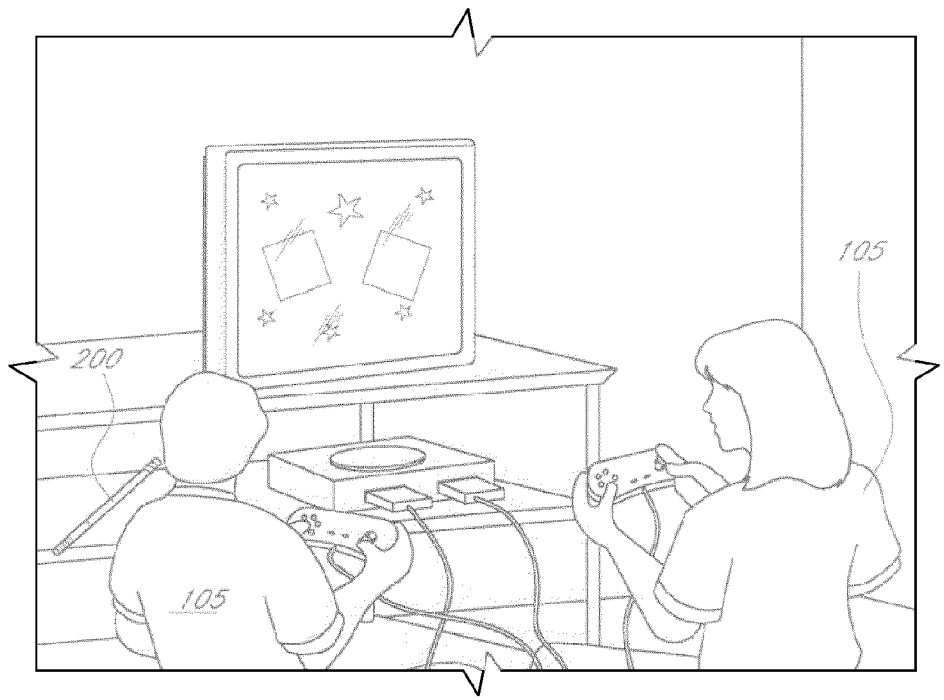
FIG. 10 is a perspective view of an interactive adventure game carried out using a computer game console and one or more wand devices.
Figure 11:
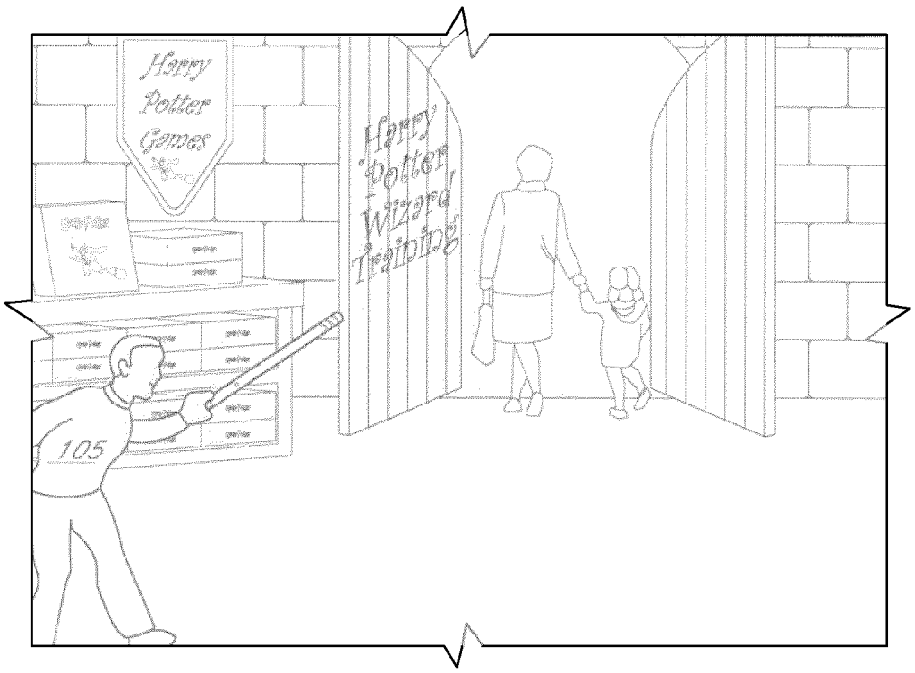
FIG. 11 is a perspective view of another alternative embodiment of an interactive adventure game center or play structure such as may be provided within a family entertainment center or theme park.
Figure 12:
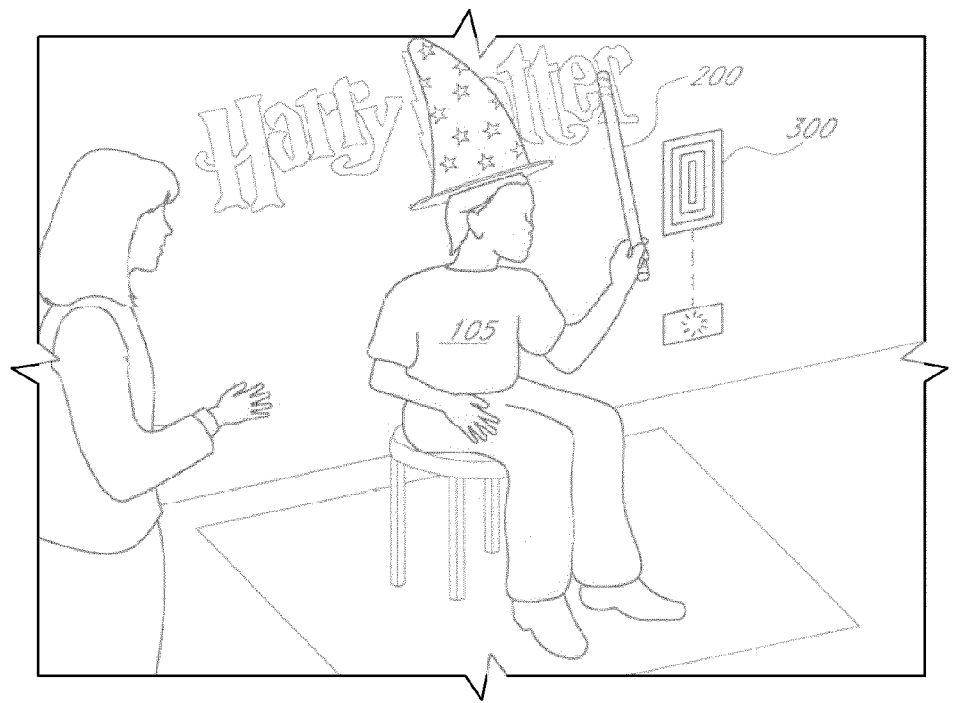
FIG. 12 is a perspective view of a play participant within an interactive adventure game center casting "magical" spells using the wand device of FIG. 1.
Figure 13:
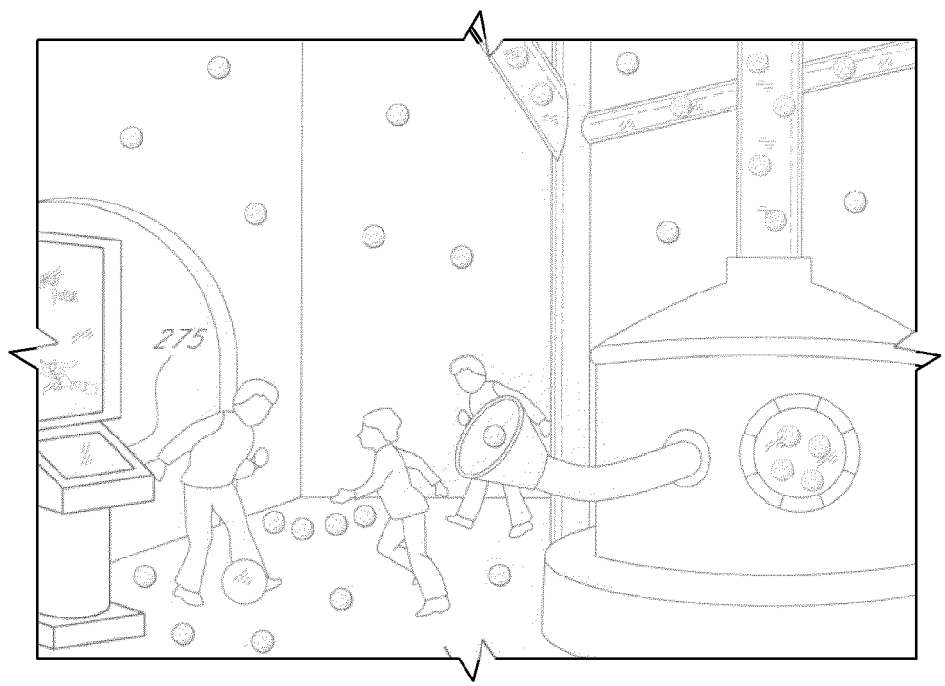
FIG. 13 is an alternative perspective view of the interactive adventure game center of FIG. 11.

The game continues within various participating retail environments. Thus, for example, FIG. 6 illustrates a local Harry Potter game adventure center created within a local book store, toy store, restaurant, or the like (e.g., FIG. 8). The game center preferably provides additional clues, assistance and/or opportunities for social interaction, information sharing and/or strategic cooperation among multiple game players. In a particularly preferred embodiment, cooperation among multiple play participants is required to allow cooperating players to advance in the game. The game center also preferably provides a distribution center for related products such as computer games, video games, wands 200 and the like (e.g. FIG. 9, 10). Purchased video games may be played at home (e.g., FIG. 10) using conventional game controllers and/or a specially configured controller (not shown) adapted to communicate wirelessly with wand 200 or a similar device.

Figure 23A:
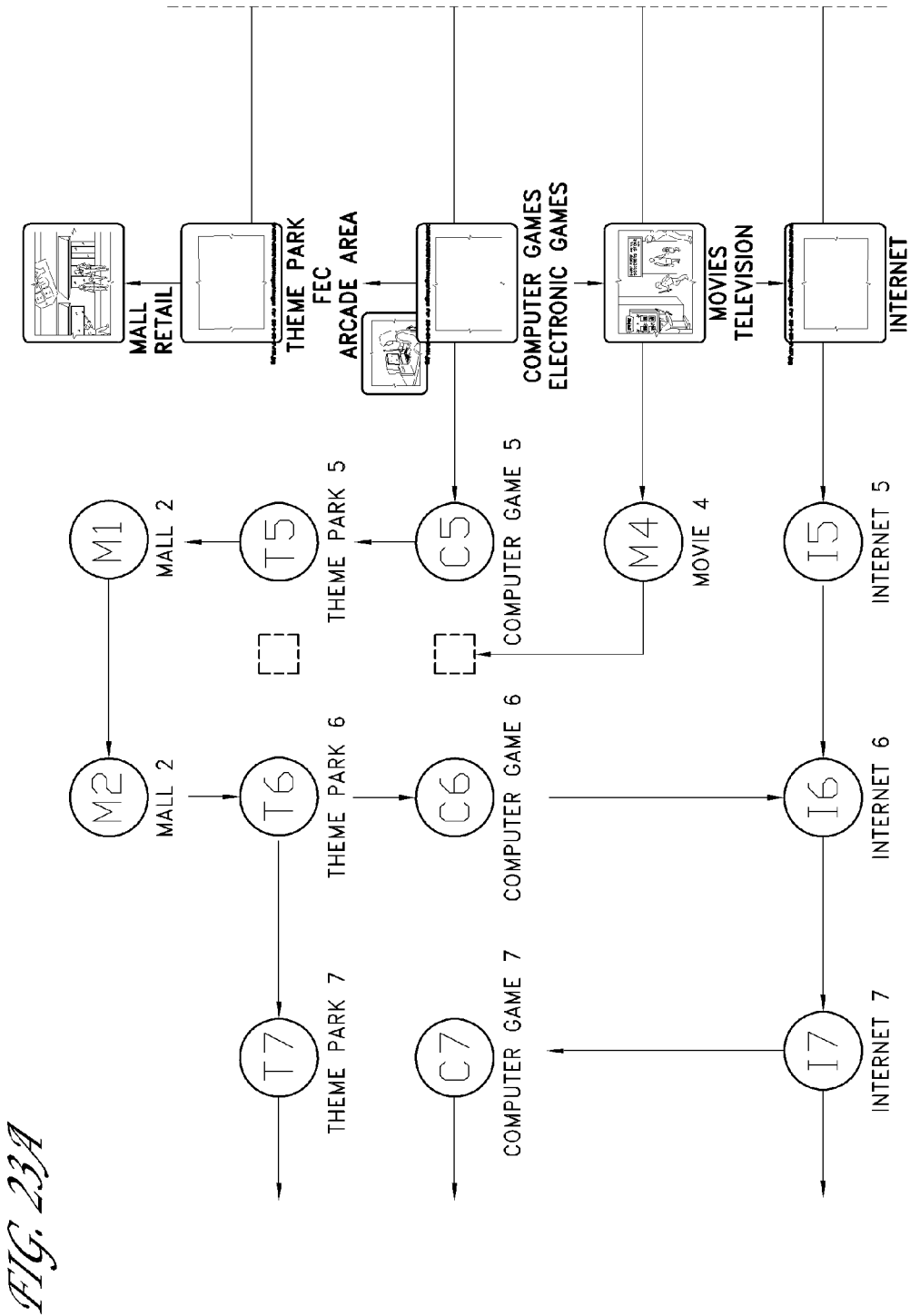
FIGS. 23A and 23B, is a schematic block diagram illustrating how an interactive adventure game in accordance with the present invention can be implemented simultaneously and seamlessly within multiple play environments and entertainment mediums.
Figure 23B:
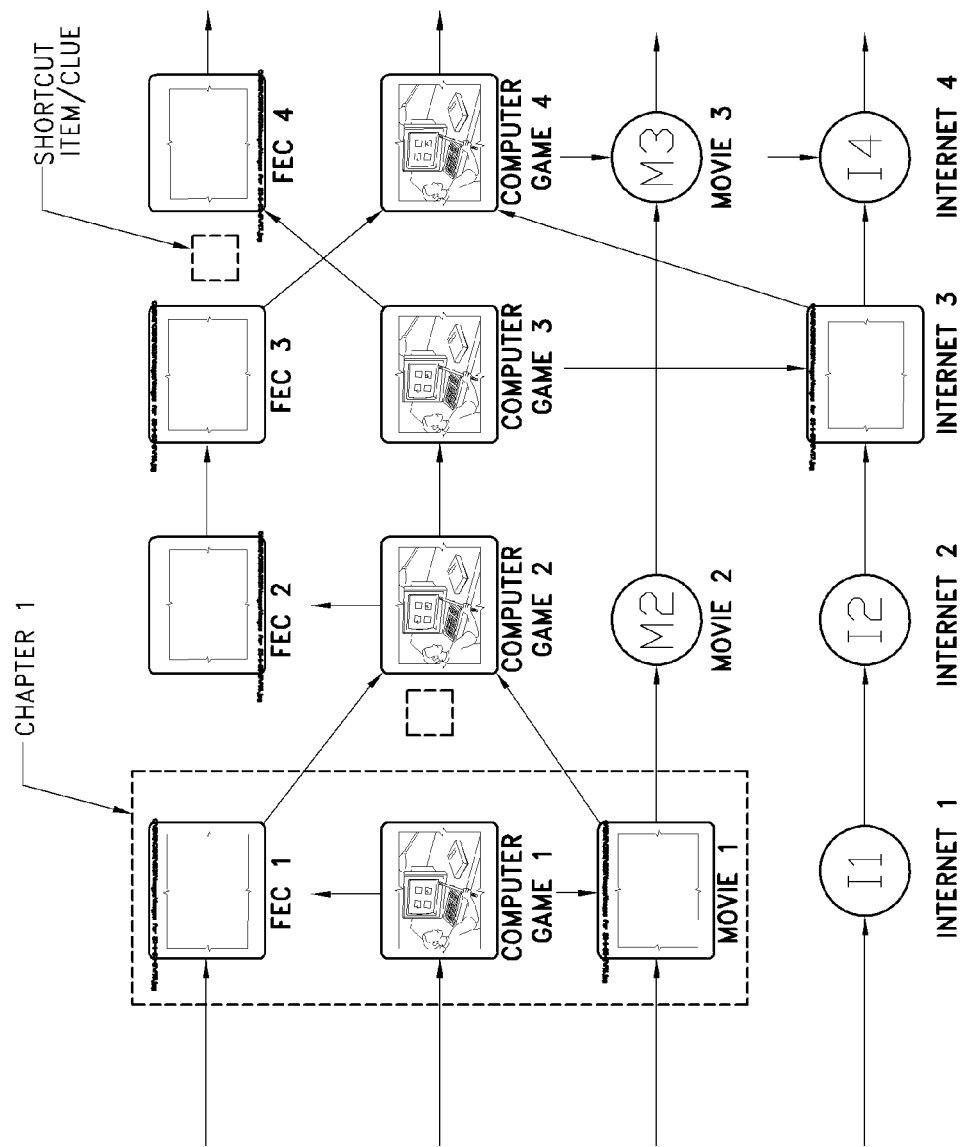

Advantageously, in this manner the game is able to transcend seamlessly from one entertainment medium to another using the wand 200 or other similar RFID-capable device as a means to store, transport and communicate character development and game progress between different entertainment mediums and play environments. Thus, game play preferably extends from the home, to television, to internet, to theatre, and/or to one or more local family entertainment centers ("FEC"), games centers, family restaurants, and the like (see, e.g., FIG. 23). For example, FIGS. 11-15 illustrate an entertainment center configured for interactive game play in accordance with the present invention. The particular entertainment center 250 illustrated takes on the theme of a "magic" training center for would-be wizards in accordance with the popular characters and storylines of the children's' book series "Harry Potter" by J. K. Rowling.

Within this family entertainment center 250, play participants 105 learn to use their magic wands 200 and/or other tracking/actuation devices. The wand 200 preferably allows play participants to electronically and "magically" interact with their surrounding play environment simply by pointing or using their wands in a particular manner to achieve desired goals or produce desired effects within the play environment. For example, various wireless receivers or transceivers 300 may be distributed throughout the play center 250 to facilitate such interaction via wireless communications. Depending upon the degree of game complexity desired and the amount of information sharing required, the transceivers 300 may or may not be connected to a master system or central server (not shown). Preferably, most, if not all, of the receivers or transceivers 300 are stand-alone devices that do not require communications with an external server or network. In one particularly preferred embodiment this may be achieved by storing any information required to be shared on the wand 200 and/or on an associated radio frequency tracking card or badge worn or carried by the play participant (described later).

If desired, a suitable play media, such as foam or rubber balls or similar objects, may be provided for use throughout the play center to provide convenient objects for clue sources, tools, trading currency and/or tactile interactive play. For example, thousands of soft foam balls may be provided as an interactive play medium (e.g., FIG. 13). These may be manipulated by play participants using various interactive play elements to create desired effects. Balls may range in size from approximately 1" to 12" in diameter or larger, as desired, and are preferable about 2½" in diameter. Preferably, the objects are not so small as to present a choking hazard for young children. The majority of the objects may be the same size, or a mixture of sizes may be utilized, as desired. Certain play elements within the play center may require the use of certain objects in order to complete a required task. For example, various play objects may be identified using one or more embedded or affixed RFID tags which may be electronically read by the various game consoles 275 within the play center 250.

Other suitable play media may include, without limitation, foam, plastic or rubber balls and similarly formed articles such as cubes, plates, discs, tubes, cones, rubber or foam bullets/arrows, the present invention not being limited to any particular preferred play media. These may be used alone or in combination with one another. For instance, flying discs, such as Frisbees™, may be flung from one location within the play center 250 while other play participants shoot at the discs using foam balls or suction-cup arrows. Wet or semi-wet play mediums, such as slime-like materials, snow, mud, squirt guns and/or water balloons may also used, as desired, to cool and entertain play participants. Durable plastic or rubber play media are preferable in an outdoor play structure where environmental exposure may prematurely destroy or degrade the quality of certain play mediums such as foam balls. The particular play media used is not particularly important for purposes of carrying out the invention and, optionally, may be omitted altogether, if desired.

Figure 14:
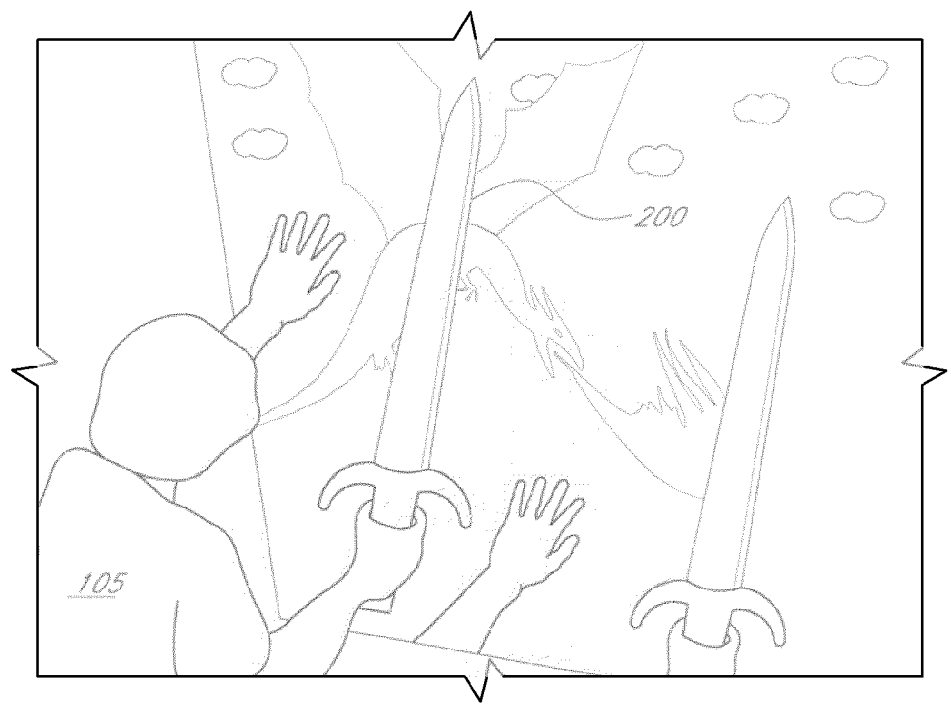
FIG. 14 is a perspective view of an RFID-enabled interactive game device or console having features of the present invention.
Figure 15:
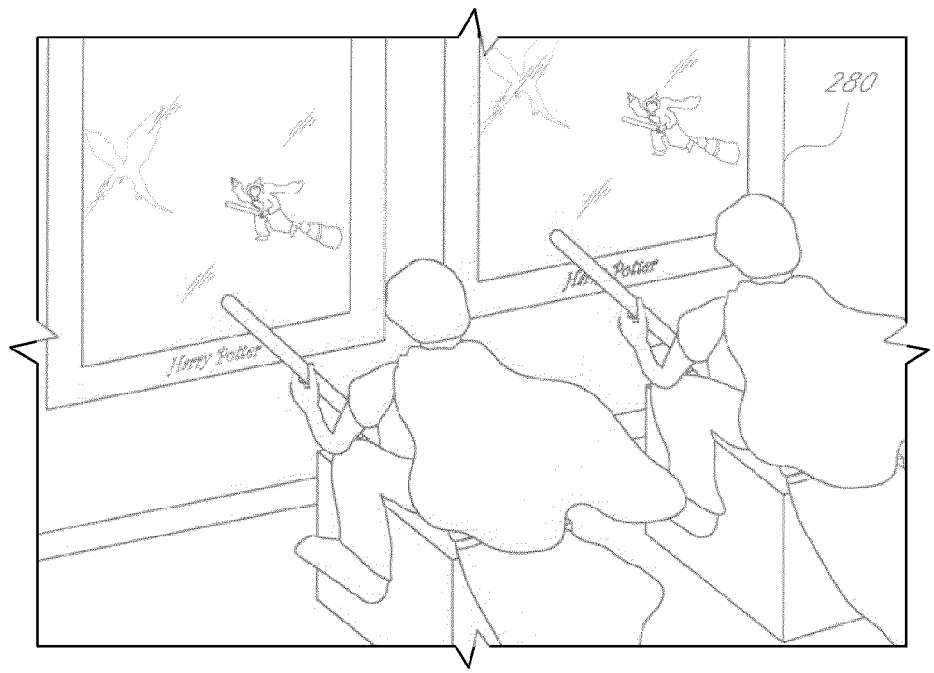
FIG. 15 is a perspective view of an RFID-enabled interactive game device, ride or console having features of the present invention.

Various interactive play elements and games 275, 280 are preferably provided within the play center 250 to allow play participants 105 to create desired "magical" effects, as illustrated in FIGS. 14 and 15. These may include interactive elements such as video games, coin-operated rides, and the like. These may be actuated manually by play participants or, more desirably, "magically" electronically by appropriately using the wand 200 in conjunction with one or more transceivers 300. Some interactive play elements may have simple immediate effects, while others may have complex and/or delayed effects. Some play elements may produce local effects while others may produce remote effects. Each play participant 105, or sometimes a group of play participants working together, preferably must experiment with the various play elements and using their magic wands in order to discover how to create the desired effect(s). Once one play participant figures it out, he or she can use the resulting play effect to surprise and entertain other play participants. Yet other play participants will observe the activity and will attempt to also figure it out in order to turn the tables on the next group. Repeated play on a particular play element can increase the participants' skills in accurately using the wand 200 to produce desired effects or increasing the size or range of such effects. Optionally, play participants can compete with one another using the various play elements to see which participant or group of participants can create bigger, longer, more accurate or more spectacular effects.

Figure 16:
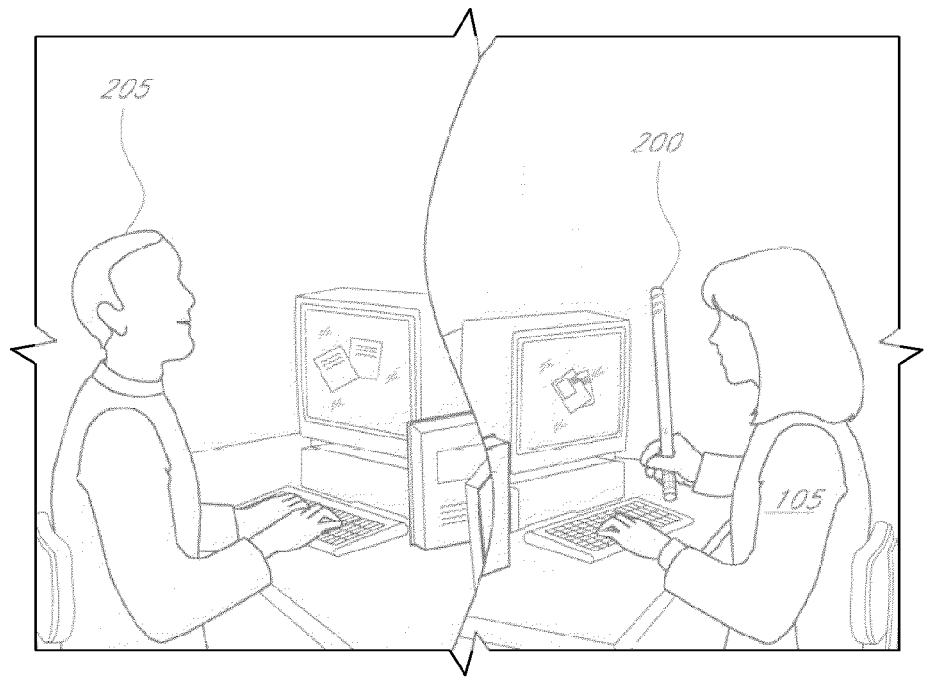
FIG. 16 is a perspective view of two play participants playing an interactive game using multiple computers communicating via the internet.

While several particularly preferred play environments have been described, it will be readily apparent to those skilled in the art that a wide variety of other possible play environments and other entertainment mediums may be used to carry out the invention. Alternatively, a suitable play environment may comprise a simple themed play area, or even a multi-purpose area such as a restaurant dining facility, family room, bedroom or the like. Internet (e.g., FIG. 16), video games, computer games, television, movies and radio can also be used to provide all or part of the overall game experience in accordance with the present invention.

Magic Wand

As indicated above, play participants 105 learn to use a "magic wand" 200 and/or other tracking/actuation device. The wand 200 preferably allows play participants to electronically and "magically" interact with their surrounding play environment simply by pointing or using their wands in a particular manner to achieve desired goals or produce desired effects within the play environment. Use of the wand 200 may be as simple as touching it to a particular surface or "magical" item within a suitably configured play environment or it maybe as complex as shaking or twisting the wand a predetermined number of times in a particular manner and/or pointing it accurately at a certain target desired to be "magically" transformed or otherwise affected. As play participants play and interact within each play environment they learn more about the "magical" powers possessed by the wand 200 and become more adept at using the wand to achieve desired goals or desired play effects. Optionally, play participants may collect points or earn additional magic levels or ranks for each play effect or task they successfully achieve. In this manner, play participants 105 may compete with one another to see who can score more points and/or achieve the highest magic level.

FIG. 17 illustrates the basic construction of one preferred embodiment of a "magic" wand 200 having features and advantages in accordance with one preferred embodiment of the invention. As illustrated in FIG. 17A the wand 200 basically comprises an elongated hollow pipe or tube 310 having a proximal end or handle portion 315 and a distal end or transmitting portion 320. If desired, an internal cavity may be provided to receive one or more batteries to power optional lighting, laser or sound effects and/or to power longer-range transmissions such as via an infrared LED transmitter device or RF transmitter device. An optional button 325 may also be provided, if desired, to enable particular desired functions, such as sound or lighting effects or longer-range transmissions.

FIG. 17B is a partially exploded detail view of the proximal end 315 of the magic wand toy 200 of FIG. 17A. As illustrated, the handle portion 315 is fitted with optional combination wheels having various symbols and/or images thereon. Preferably, certain wand functions may require that these wheels be rotated to produce a predetermined pattern of symbols such as three owls, or an owl, a broom and a moon symbol. Those skilled in the art will readily appreciate that the combination wheels may be configured to actuate electrical contacts and/or other circuitry within the wand 200 in order to provide the desired functionality. Alternatively, the combination wheels may provide a simple security measure to prevent unauthorized users from actuating the wand. Alternatively, the wheels may provide a simple encoder/decoder mechanism for encoding, decoding, interpreting and/or transforming secret codes or passwords used during game play.

FIG. 17C is a partial cross-section detail view of the distal end of magic wand toy 200 of FIG. 17A. As illustrated, the distal end 320 is fitted with an RFID (radio frequency identification device) transponder 335 that is operable to provide relatively short-range RF communications (<60 cm) with one or more of the receivers or transceivers 300 distributed throughout a play environment (e.g., FIGS. 11, 12). At its most basic level, RFID provides a wireless link to uniquely identify objects or people. It is sometimes called dedicated short range communication (DSRC). RFID systems include electronic devices called transponders or tags, and reader electronics to communicate with the tags. These systems communicate via radio signals that carry data either unidirectionally (read only) or, more preferably, bi-directionally (read/write). One suitable RFID transponder is the 134.2 kHz/123.2 kHz, 23 mm Glass Transponder available from Texas Instruments, Inc. (http://www.tiris.com, Product No. RI-TRP-WRHP). This transponder basically comprises a passive (non-battery-operated) RF transmitter/receiver chip 340 and an antenna 345 provided within an hermetically sealed vial 350. A protective silicon sheathing 355 is preferably inserted around the sealed vial 350 between the vial and the inner wall of the tube 310 to insulate the transponder from shock and vibration.

Figure 18:
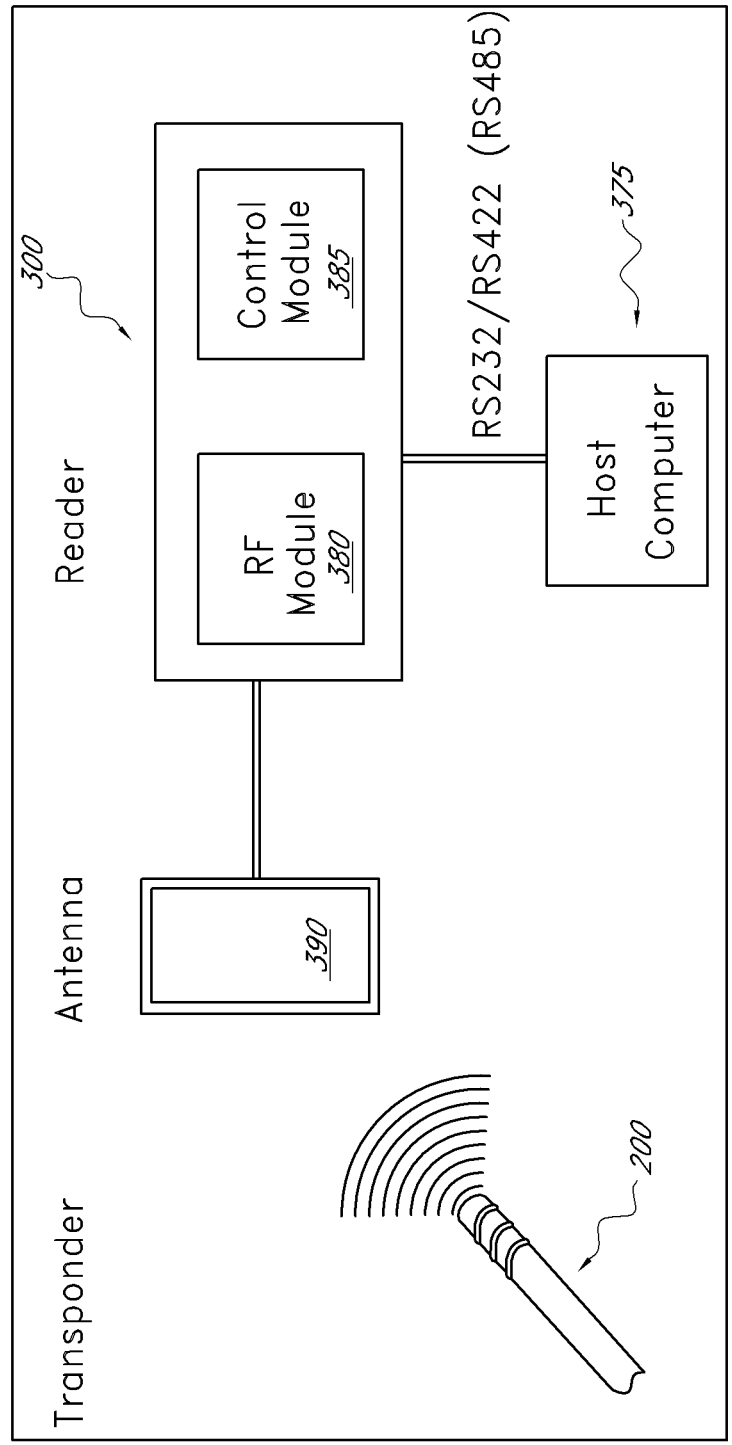
FIG. 18 is a simplified schematic diagram of an RF reader and master control system for use with the magic wand toy actuator of FIG. 17A having features and advantages in accordance with the present invention.

FIG. 18 is a simplified schematic diagram of one embodiment of an RF transceiver 300 and optional master control system 375 for use with the magic wand toy actuator of FIG. 17A. As illustrated, the transceiver 300 basically comprises an RF Module 380, a Control Module 385 and an antenna 390. When the distal end of wand 200 comes within a predetermined range of antenna 390 (~20-60 cm) the transponder antenna 345 (FIG. 17C) becomes excited and impresses a voltage upon the RF transmitter/receiver chip 340 disposed within transponder 335 at the distal end of the wand 200. In response, the RF transmitter/receiver chip 340 causes transponder antenna 345 to broadcast certain information stored within the transponder 335 comprising 80 bits of read/write memory. This information typically includes the user's unique ID number, magic level or rank and/or certain other information pertinent to the user or the user's play experiences.

This information is initially received by RF Module 380, which can then transfer the information through standard interfaces to an optional Host Computer 375, Control Module 385, printer, or programmable logic controller for storage or action. If appropriate, Control Module 385 provides certain outputs to activate or control one or more associated play effects, such as lighting, sound, various mechanical or pneumatic actuators or the like. Optional Host Computer 375 processes the information and/or communicates it to other transceivers 300, as may be required by the game. If suitably configured, RF Module 380 may also broadcast or "write" certain information back to the transponder 335 to change or update one of more of the 80 read/write bits in its memory. This exchange of communications occurs very rapidly (~70 ms) and so from the user's perspective it appears to be instantaneous. Thus, the wand 200 may be used in this "short range" or "passive" mode to actuate various "magical" effects throughout the play structure 100 by simply touching or bringing the tip of the wand 200 into relatively close proximity with a particular transceiver 300. To provide added mystery and fun, certain transceivers 300 may be provided as hidden clue stations within a play environment so that they must be discovered by play participants 105. The locations of hidden transceivers and/or other clue stations may be changed from time to time to keep the game fresh and exciting.

If desired, the wand 200 may also be configured for long range communications with one or more of the transceivers 300 (or other receivers) disposed within a play environment. For example, one or more transceivers 300 may be located on a roof or ceiling surface, on an inaccessible theming element, or other area out of reach of play participants. Such long-rage wand operation may be readily achieved using an auxiliary battery powered RF transponder, such as available from Axcess, Inc., Dallas, Tex. If line of sight or directional actuation is desired, a battery-operated infrared LED transmitter and receiver of the type employed in television remote control may be used, as those skilled in the art will readily appreciate. Of course, a wide variety of other wireless communications devices, as well as various sound and lighting effects may also be provided, as desired. Any one or more of these may be actuated via button 325, as desirable or convenient.

Additional optional circuitry and/or position sensors may be added, if desired, to allow the "magic wand" 200 to be operated by waiving, shaking, stroking and/or tapping it in a particular manner. If provided, these operational aspects would need to be learned by play participants as they train in the various play environments. One goal, for example, may be to become a "grand wizard" or master of the wand. This means that the play participant 105 has learned and mastered every aspect of operating the wand to produce desired effects within each play environment. Of course, additional effects and operational nuances can (and preferably are) always added over time in order to keep the interactive experience fresh and continually changing. Optionally, the wand 200 may be configured such that it is able to display 50 or more characters on a LTD or LCD screen. The wand may also be configured to respond to other signals, such as light, sound, or voice commands as will be readily apparent to those skilled in the art. This could be useful, for example for generating, storing and retrieving secret pass words, informational clues and the like.

RFID Tracking Card/Badge

Figure 19A:
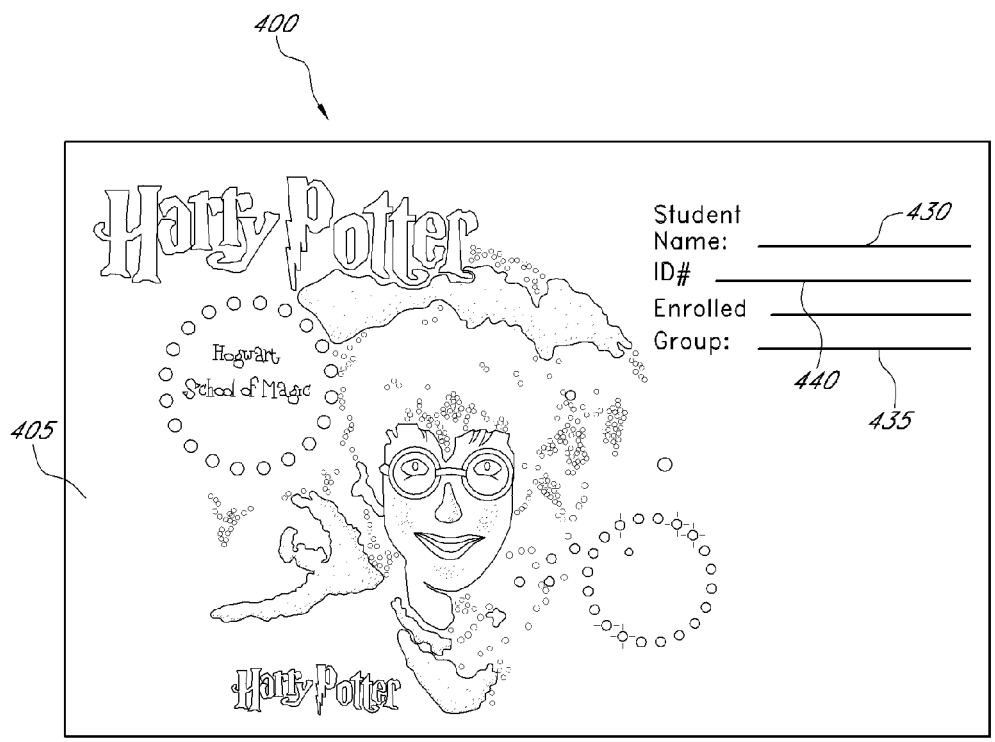
FIGS. 19A and 19B are front and rear views, respectively, of an optional RFID tracking badge or card for use within an interactive adventure game paving features and advantages in accordance with the present invention.
Figure 19B:
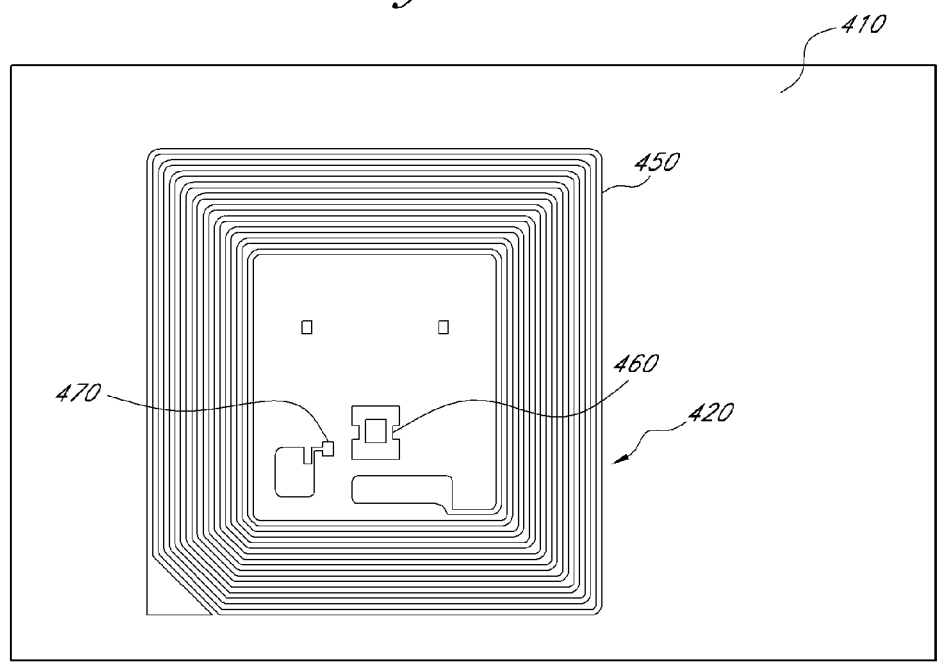

FIGS. 19A and 19B are front and rear views, respectively, of an optional or alternative RFID tracking badge or card 400 for use within the interactive game described above. This may be used instead of or in addition to the wand 200, described above. The particular badge 400 illustrated is intended to be affixed or adhered to the front of a shirt or blouse worn by a play participant during their visit to suitably equipped play or entertainment facilities. The badge preferably comprises a paper, cardboard or plastic substrate having a front side 404 and a back side 410. The front 405 of each card/badge 400 may be imprinted with graphics, photos, treasure maps or any other information desired. In the particular embodiment illustrated, the front 405 contains an image of Harry Potter in keeping with the overall theme of the game described above. In addition, the front 405 of the badge 400 may include any number of other designs or information pertinent to its application. For example, the guest's name 430, and group 435 may be indicated for convenient reference. A unique tag ID Number 440 may also be displayed for convenient reference and is particularly preferred where the badge 400 is to be reused by other play participants.

The obverse side 410 of the badge 400 contains the badge electronics comprising a radio frequency tag 420 pre-programmed with a unique person identifier number ("UPIN"). The tag 420 generally comprises a spiral wound antenna 450, a radio frequency transmitter clip 460 and various electrical leads and terminals 470 connecting the chip 460 to the antenna. Advantageously, the UPIN may be used to identify and track individual play participants within the play facility. Optionally, each tag 420 may also include a unique group identifier number ("UGIN") which may be used to match a defined group of individuals having a predetermined relationship—either pre-existing or contrived for purposes of game play. If desired, the tag 420 may be covered with an adhesive paper label (not shown) or, alternatively, may be molded directly into a plastic sheet substrate comprising the card 400.

Various readers distributed throughout a park or entertainment facility are able to read the RFID tags 420. Thus, the UPIN and UGIN information can be conveniently read and provided to an associated master control system, display system or other tracking, recording or display device for purposes of creating a record of each play participant's experience within the play facility. This information may be used for purposes of calculating individual or team scores, tracking and/or locating lost children, verifying whether or not a child is inside a facility, photo capture & retrieval, and many other useful purposes as will be readily obvious and apparent to those skilled in the art.

Preferably, the tag 420 is passive (requires no batteries) so that it is inexpensive to purchase and maintain. Such tags and various associated readers and other accessories are commercially available in a wide variety of configurations, sizes and read ranges. RFID tags having a read range of between about 10 cm to about 100 cm are particularly preferred, although shorter or longer read ranges may also be acceptable. The particular tag illustrated is the 13.56 MHz tag sold under the brand name Taggit™ available from Texas Instruments, Inc. (http://www.tiris.com, Product No. RI-103-110A). The tag 420 has a useful read/write range of about 25 cm and contains 256-bits of on-board memory arranged in 8×32-bit blocks which may be programmed (written) and read by a suitably configured read/write device. Such tag device is useful for storing and retrieving desired user-specific information such as UPIN, UGIN, first and/or last name, age, rank or level, total points accumulated, tasks completed, facilities visited, etc. If a longer read/write range and/or more memory is desired, optional battery-powered tags may be used instead, such as available from ACXESS, Inc. and/or various other vendors known to those skilled in the art.

Figures 20A, 20B:
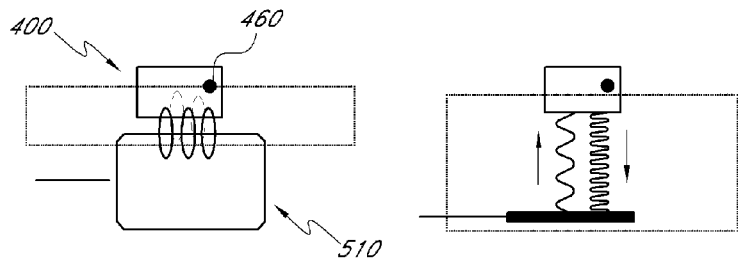
FIGS. 20A and 20B are schematic diagrams illustrating typical operation of the RFID tracking badge of FIG. 19.
Figure 21:
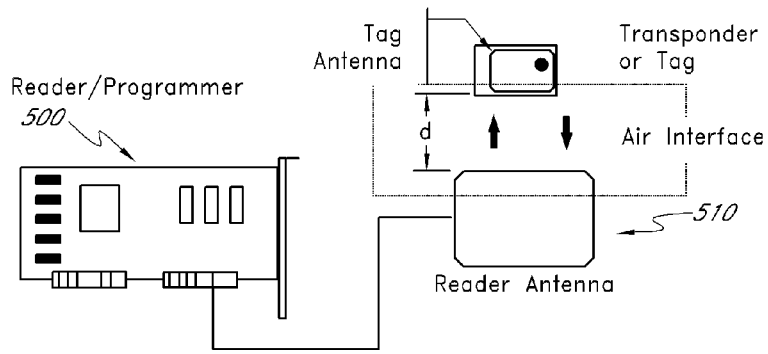
FIG. 21 is simplified schematic diagram of an RFID read/write system for use with the RFID tracking badge of FIG. 19 having features and advantages in accordance with the present invention.

FIGS. 20 and 21 are simplified schematic illustrations of tag and reader operation. The tag 420 is initially activated by a radio frequency signal broadcast by an antenna 510 of an adjacent reader or activation device 500. The signal impresses a voltage upon the antenna 450 by inductive coupling which is then used to power the chip 460 (see, e.g., FIG. 20A). When activated, the chip 460 transmits via radio frequency a unique identification number preferably corresponding to the UPIN and/or UGIN described above (see, e.g., FIG. 20B). The signal may be transmitted either by inductive coupling or, more preferably, by propagation coupling over a distance "d" determined by the range of the tag/reader combination. This signal is then received and processed by the associated reader 500 as described above. If desired, the RFID card or badge 400 may also be configured for read/write communications with an associated reader/writer. Thus, the unique tag identifier number (UPIN or UGIN) can be changed or other information may be added.

As indicated above, communication of data between a tag and a reader is by wireless communication. As a result, transmitting such data is always subject to the vagaries and influences of the media or channels through which the data has to pass, including the air interface. Noise, interference and distortion are the primary sources of data corruption that may arise. Thus, those skilled in the art will recognize that a certain degree of care should be taken in the placement and orientation of readers 500 so as to minimize the probability of such data transmission errors. Preferably, the readers are placed at least 30-60 cm away from any metal objects, power lines or other potential interference sources. Those skilled in the art will also recognize that the write range of the tag/reader combination is typically somewhat less (~10-15% less) than the read range "d" and, thus, this should also be taken into account in determining optimal placement and positioning of each reader device 500.

Typical RFID data communication is asynchronous or unsynchronized in nature and, thus, particular attention should be given in considering the form in which the data is to be communicated. Structuring the bit stream to accommodate these needs, such as via a channel encoding scheme, is preferred in order to provide reliable system performance. Various suitable channel encoding schemes, such as amplitude shift keying (ASK), frequency shift keying (FSK), phase shift keying (PSK) and spread spectrum modulation (SSM), are well know to those skilled in the art and will not be further discussed herein. The choice of carrier wave frequency is also important in determining data transfer rates. Generally speaking the higher the frequency the higher the data transfer or throughput rates that can be achieved. This is intimately linked to bandwidth or range available within the frequency spectrum for the communication process. Preferably, the channel bandwidth is selected to be at least twice the bit rate required for the particular game application.

Figure 22:
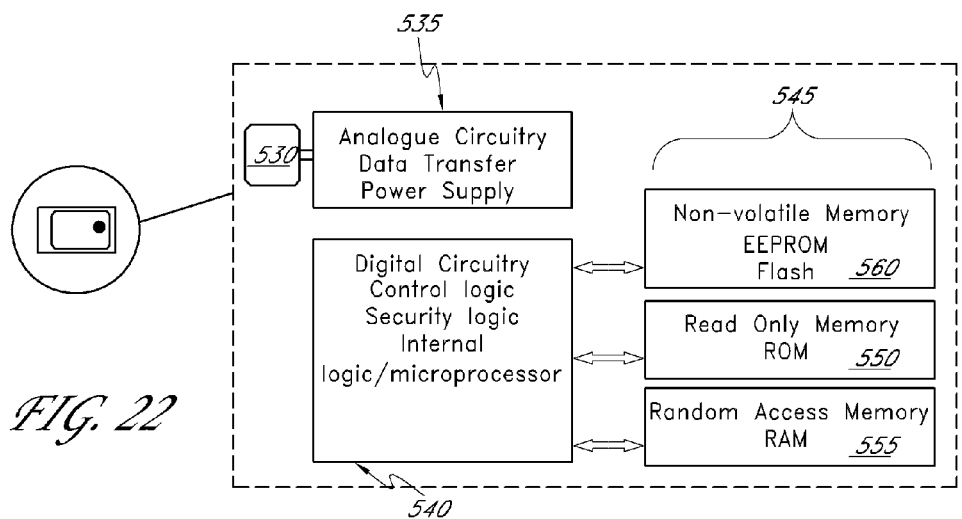
FIG. 22 is a simplified block diagram illustrating the basic organization and function of the electronic circuitry comprising the RFID tag device of FIG. 19B.

FIG. 22 is a simplified block diagram illustrating the basic organization and function of the electronic circuitry comprising the radio frequency transmitter chip 460 of the RFID tag device 420 of FIG. 19B. The chip 460 basically comprises a central processor 530, Analogue Circuitry 535, Digital Circuitry 540 and on-board memory 545. On-board memory 545 is divided into read-only memory (ROM) 550, random access memory (RAM) 555 and non-volatile programmable memory 560, which is available for data storage. The ROM-based memory 550 is used to accommodate security data and the tag operating system instructions which, in conjunction with the processor 530 and processing logic deals with the internal "house-keeping" functions such as response delay timing, data flow control and power supply switching. The RAM-based memory 555 is used to facilitate temporary data storage during transponder interrogation and response. The non-volatile programmable memory 560 may take various forms, electrically erasable programmable read only memory (EEPROM) being typical. It is used to store the transponder data and is preferably non-volatile to ensure that the data is retained when the device is in its quiescent or power-saving "sleep" state.

Various data buffers or further memory components (not shown), may be provided to temporarily hold incoming data following demodulation and outgoing data for modulation and interface with the transponder antenna 450. Analog Circuitry 535 provides the facility to direct and accommodate the interrogation field energy for powering purposes in passive transponders and triggering of the transponder response. Analog Circuitry also provides the facility to accept the programming or "write" data modulated signal and to perform the necessary demodulation and data transfer processes. Digital Circuitry 540 provides certain control logic, security logic and internal microprocessor logic required to operate central processor 530.

Role Play Character Cards

The RFID card 400 illustrated and described above is used, in accordance with the afore-mentioned preferred embodiment, to identify and track individual play participants and/or groups of play participants within a play facility. However, in another preferred embodiment, the same card 400 and/or a similarly configured RFID or a magnetic "swipe" card or the like may be used to store certain powers or abilities of an imaginary role-play character that the card 400 represents.

For example, card 400 may represent the Harry Potter character. As each play participant uses his/her favorite character card in various Harry Potter play facilities the Harry Potter character represented by the card 400 gains (or loses) certain attributes, such as magic skill level, magic strength, flight ability, various spell-casting abilities, etc. All of this information is preferably stored on the card 400 so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

For example, character attributes developed during a play participant's visit to a local Harry Potter/Hogwart magic facility are stored on the card 400. When the play participant then revisits the same or another Harry Potter play facility, all of the attributes of his character are "remembered" on the card so that the play participant is able to continue playing with and developing the same role-play character. Similarly, various video games, home game consoles, and/or hand-held game units can be and preferably are configured to communicate with the card 400 in a similar manner as described above and/or using other well-known information storage and communication techniques. In this manner, a play participant can use the character card 400 and the role play character he or she has developed with specific associated attributes in a favorite video action game, role-play computer game or the like.

Master Control System

Depending upon the degree of game complexity desired and the amount of information sharing required, the transceivers 300 may or may not be connected to a master control system or central server 375 (FIG. 18). If a master system is utilized, preferably each wand 200 and/or RFID card 400 is configured to electronically send and receive information to and from various receivers or transceivers 300 distributed throughout a play facility using a send receive radio frequency ("SRRF") communication protocol. This communications protocol provides the basic foundation for a complex, interactive entertainment system which creates a seemingly magic interactive play experience for play participants who possess and learn to use the magical wand. In its most refined embodiments, a user may electronically send and receive information to and from other wands and/or to and from a master control system located within and/or associated with any of a number of play environments, such as a family entertainment facility, restaurant play structure, television/video/radio programs, computer software program, game console, web site, etc. This newly created network of SRRF-compatible play and entertainment environments provides a complex, interactive play and entertainment system that creates a seamless magical interactive play experience that transcends conventional physical and temporal boundaries.

SRRF may generally be described as an RF-based communications technology and protocol that allows pertinent information and messages to be sent and received to and from two or more SRRF compatible devices or systems. While the specific embodiments descried herein are specific to RF-based communication systems, those skilled in the art will readily appreciate that the broader interactive play concepts taught herein may be realized using any number of commercially available 2-way and/or 1-way medium range wireless communication devices and communication protocols such as, without limitation, infrared-, digital-, analog, AM/FM-, laser-, visual-, audio-, and/or ultrasonic-based systems, as desired or expedient.

The SRRF system can preferably send and receive signals (up to 40 feet) between tokens and fixed transceivers. The system is preferably able to associate a token with a particular zone as defined by a token activation area approximately 10-15 feet in diameter. Different transceiver and antenna configurations can be utilized depending on the SRRF requirements for each play station. The SRRF facility tokens and transceivers are networked throughout the facility. These devices can be hidden in or integrated into the facility's infrastructure, such as walls, floors, ceilings and play station equipment. Therefore, the size and packaging of these transceivers is not particularly critical.

In a preferred embodiment, an entire entertainment facility may be configured with SRRF technology to provide a master control system for an interactive entertainment play environment using SRRF-compatible magic wands and/or tracking devices. A typical entertainment facility provided with SRRF technology may allow 300-400 or more users to more-or-less simultaneously send and receive electronic transmissions to and from the master control system using a magic wand or other SRRF-compatible tracking device.

In particular, the SRRF system uses a software program and data-base that can track the locations and activities of up to a hundred or more users. This information is then used to adjust the play experience for the user based on "knowing" where the user/player has been, what objectives that player has accomplished and how many points or levels have been reached. The system can then send messages to the user throughout the play experience. For example, the system can allow or deny access to a user into a new play area based on how many points or levels reached by that user and/or based on what objectives that user has accomplished or helped accomplish. It can also indicate, via sending a message to the user the amount of points or specific play objectives necessary to complete a "mission" or enter the next level of play. The master control system can also send messages to the user from other users.

The system is preferably sophisticated enough that it can allow multiple users to interact with each other adjusting the game instantly. The master system can also preferably interface with digital imaging and/or video capture so that the users' activities can be visually tracked. Any user can locate another user either through the video capturing system or by sending a message to another device. At the end of a visit, users are informed of their activities and the system interfaces with printout capabilities. The SRRF system is preferably capable of sending and receiving signals up to 100 feet. Transmitter devices can also be hidden in walls or other structures in order to provide additional interactivity and excitement for play participants.

Suitable embodiments of the SRRF technology described above may be obtained from a number of suitable sources, such as AXCESS, Inc. and, in particular, the AXCESS active RFID network system for asset and people tacking applications. In another preferred embodiment the system comprises a network of transceivers 300 installed at specific points throughout a facility. Players are outfitted or provided with a reusable "token"—a standard AXCESS personnel tag clipped to their clothing in the upper chest area. As each player enters a specific interactive play area or "game zone" within the facility, the player's token receives a low frequency activation signal containing a zone identification number (ZID). The token then responds to this signal by transmitting both its unique token identification number (TID) along with the ZID, thus identifying and associating the player with a particular zone.

The token's transmitted signal is received by a transceiver 300 attached to a data network built into the facility. Using the data network, the transceiver forwards the TID/ZID data to a host computer system. The host system uses the SRRF information to log/track the guest's progress through the facility while interfacing with other interactive systems within the venue. For example, upon receipt of a TID/ZID message received from Zone 1, the host system may trigger a digital camera focused on that area, thus capturing a digital image of the player which can now be associated with both their TID and the ZID at a specific time. In this manner, the SRRF technology allows the master control system to uniquely identity and track people as they interact with various games and activities in a semi-controlled play environment. Optionally, the system may be configured for two-way messaging to enable more complex interactive gaming concepts.

In another embodiment, the SRRF technology can be used in the home. For enabling Magic at the home, a small SRRF module is preferably incorporated into one or more portable toys or objects that may be as small as a beeper. The SRRF module supports two-way communications with a small home transceiver, as well as with other SRRF objects. For example, a Magic wand 200 can communicate with another Magic wand 200.

The toy wand or other object 200 may also include the ability to produce light, vibration or other sound effects based on signals received through the SRRF module. In a more advanced implementation, the magical object may be configured such that it is able to display preprogrammed messages of up to 50 characters on a LCD screen when triggered by user action (e.g., button) or via signals received through the SRRF module. This device is also preferably capable of displaying short text messages transmitted over the SRRF wireless link from another SRRF-compatible device.

Preferably, the SRRF transceiver 300 is capable of supporting medium-to-long range (10-40 feet) two-way communications between SRRF objects and a host system, such as a PC running SRRF-compatible software. This transceiver 300 has an integral antenna and interfaces to the host computer through a dedicated communication port using industry standard RS232 serial communications. It is also desirable that the SRRF transmission method be flexible such that it can be embedded in television or radio signals, videotapes, DVDs, video games and other programs media, stripped out and re-transmitted using low cost components. The exact method for transposing these signals, as well as the explicit interface between the home transceiver and common consumer electronics (i.e., TVs, radios, VCRs, DVD players, NV receivers, etc.) is not particularly important, so long as the basic functionality as described above is achieved. The various components needed to assemble such an SRRF system suitable for use with the present invention are commercially available and their assembly to achieve the desired functionality described above can be readily determined by persons of ordinary skill in the art. If desired, each SRRF transceiver may also incorporate a global positioning ("GPS") device to track the exact location of each play participant within one or more play environments.

Most desirably, a SRRF module can be provided in "chip" form to be incorporated with other electronics, or designed as a packaged module suitable for the consumer market. If desired, the antenna can be embedded in the module, or integrated into the toy and attached to the module. Different modules and antennas may be required depending on the function, intelligence and interfaces required for different devices. A consumer grade rechargeable or user replaceable battery may also be used to power both the SRRF module and associated toy electronics.

Interactive Game Play

The present invention may be carried out using a wide variety of suitable game play environments, storylines and characters, as will be readily apparent to those skilled in the art. The following specific game play examples are provided for purposes of illustration and for better understanding of the invention and should not be taken as limiting the invention in any way:

EXAMPLE 1

An overall interactive gaming experience and entertainment system is provided (called the "Magic" experience), which tells a fantastic story that engages children and families in a never-ending adventure based on a mysterious treasure box filled with magical objects. Through a number of entertainment venues such as entertainment facilities, computer games, television, publications, web sites, and the like, children learn about and/or are trained to use these magical objects to become powerful "wizards" within one or more defined "Magic" play environments. The play environments may be physically represented, such as via an actual existing play structure or family entertainment center, and/or it may be visually/aurally represented via computer animation, television radio and/or other entertainment venue or source.

The magical objects use the SRRF communications system allowing for messages and information to be received and sent to and from any other object or system. Optionally, these may be programmed and linked to the master SRRF system. Most preferably, the "magic wand" 200 is configured to receive messages from any computer software, game console, web site, and entertainment facility, television program that carries the SRRF system. In addition, the magic wand can also preferably send messages to any SRRF compatible system thus allowing for the "wand" to be tracked and used within each play environment where the wand is presented. The toy or wand 200 also preferably enables the user to interact with either a Master system located within a Magic entertainment facility and/or a home-based system using common consumer electronic devices such as a personal computer, VCR or video game system.

The master control system for a Magic entertainment facility generally comprises: (1) a "token" (gag, toy, wand 200 or other device) carried by the user 105, (2) a plurality of receivers or transceivers 300 installed throughout the facility, (3) a standard LAN communications system (optional), and (4) a master computer system interfaced to the transceiver network (optional). If a Master computer system is used, preferably the software program running on the Master computer is capable of tracking the total experience for hundreds of users substantially in real time. The information is used to adjust the play for each user based on knowing the age of the user, where the user has played or is playing, points accumulated, levels reached and specific objectives accomplished. Based on real-time information obtained from the network, the system can also send messages to the user as they interact throughout the Magic experience.

The Master system can quickly authorize user access to a new play station area or "zone" based on points or levels reached. It can also preferably indicate, via sending a message to the user, the points needed or play activities necessary to complete a "mission." The Master system can also send messages to the user from other users. The system is preferably sophisticated enough to allow multiple users to interact with each other while enjoying the game in real-time.

Optionally, the Master system can interface with digital imaging and video capture so that the users' activities can be visually tracked. Users can locate another user either through the video capturing system or by sending a message to another device. At the end of a visit, users are shown photos of their activities related to the Magic experience via display or printout.

For relatively simple interactive games, the Master system may be omitted in order to save costs. In that case, any game-related information required to be shared with other receivers or transceivers may be communicated via an RS-232 hub network, Ethernet, or wireless network, or such information may be stored on the wand itself and/or an associated RFID card or badge carried by the play participant (discussed later). For retrofit applications, it is strongly preferred to provide substantially all stand-alone receivers or transceivers that do not communicate to a master system or network. This is to avoid the expense of rewiring existing infrastructure. For these applications, any information required to be shared by the game system is preferably stored on the wand or other RFID device(s) carried by the play participants. Alternatively, if a more complex game experience is demanded, any number of commercially available wireless networks may be provided without requiring rewiring or existing infrastructure.

EXAMPLE 2

Game participants are immersed in a treasure hunt adventure that combines old fashioned storytelling, live entertainment, hands-on play and interactive gaming together in a seamless experience. The game is carried out in multiple venues and using multiple entertainment mediums so that cross-media promotion and traffic is encouraged and provided by the game (see, e.g., FIG. 23).

The treasure hunt is brought to life through a live-action story and interactive game using the RFID tag technology. Play participants receive points (optionally redeemable for one or more prizes) for searching and successfully finding clues and other items and for solving various puzzles and the final mystery of the whereabouts of a lost treasure located at Stone Mountain, Ga. Guests are awarded points for finding 18-20 hidden and not-so hidden items such as a framed letter, a painting on the wall, bottle of elixir buried amongst props, etc. These clues and other items are preferably distributed throughout a park facility and in various retail, restaurant and entertainment buildings for which the park desires to generate additional walk-in traffic.

Each item found is worth a certain number of points and/or reveals to the player one or more clue(s) needed to advance in the game. Clues may be the location of other hidden items, tools or clues. Preferably the clues are revealed in an appropriately themed manner, such as a local newspaper account, programmed and staff-led storytelling, signage, performances, and various interactive game consoles. The story is eventually revealed as follows:

Sample Storyline

In 1790 Alexander McIlivray, son of a Scottish solider and Muskogee Indian Princess, became an important friend of both the Indians and the United States government. He met with several important men at Stone Mountain to put together a peace treaty between the Indians and the government. George Washington invited him to meet with him in New York where they agreed to the Treaty of New York. For his efforts, Alexander was made a "ingather General in the army with a pension. It is believed that he was also given $100,000 gold coins.

This treasure of gold coins was passed down several generations and it is reported to be buried at Stone Mountain. Many in the town believe the story is legend, but two unrelenting men believe that it is true. A famous Historian by the name of Andrew Johnson, and an adventurer by the name of Tom Willingham, are convinced that the treasure exists and have spent the last 10 years searching for the gold. The last living relative to McIlivray buried the treasure but wanted the search to be difficult and has left important and revealing clues throughout the town of Crossroads. The two men's journey is coming to an exciting conclusion in that they have discovered that the final clue is buried under the fountain/mine/bust of Alexander McIlivary near the center of town. As they dig in "present" day for their final clue, they tell the story of their hunt for the treasure over the last decade. One and all are invited to retrace their steps in their search for the gold and become a part of the grand adventure when the final clue is revealed to where the treasure is buried.

Game Play

By participating in the game players receive valuable points for each level of accomplishment they make in finding these clues and items which could either give them high point rankings and/or earn them a prize or chance at a large prize in the future (e.g. part of a real treasure). Advantageously, clues and other necessary items are preferably hidden within various retail stores and designated entertainment areas giving kids and adults fun and alluring reasons to go inside buildings and seek out new experiences they might have otherwise overlooked.

Once a player completes the game, her or she will have collected enough points, clues and other information that will give them the knowledge they need to discover and/or solve the final clue of where the treasure is buried. The "reward" for successfully completing the game could be, for example, a small prize, recognition certificate, a sweepstakes entry to win a large prize.

EXAMPLE 3

Game participants are immersed in a worldwide treasure hunt adventure to locate a large, unknown amount or money stashed away in one or more Swiss bank accounts (the money and the accounts can be real or "made-up").

Sample Storyline

Willy Wonkers, a reclusive/eccentric billionaire, was unsure which of his many would-be heirs was worthy to receive his vast fortunes. So he provided in his will that upon his demise his entire estate was to be liquidated and all of the proceeds placed in a number of anonymous Swiss bank accounts (under secret passwords known only to Willy) to be distributed to only such heir(s) who prove themselves worthy of inheriting my vast fortunes by successfully completing the Wonkers Worldwide Worthiness Challenge"—a series of intellectual, physical and moral challenges devised by Willy.

To create the ultimate "worthiness" challenge, Willy employed a team of a thousand of the world's top scientists, psychologists, teachers, musicians, engineers, doctors, etc. The goal was to develop a number of probative tests/challenges that would ultimately reveal the worthy recipient(s) of Willy's vast fortunes. Per Willy's instructions the challenges were very carefully and meticulously designed to ensure that only persons of the highest character and pureness of heart/mind could ever succeed in completing all of the necessary challenges and thereby obtain Willy's fortunes. Willy was especially vigilant to thwart the possible feigning efforts of unscrupulous persons who might attempt to gain access to his fortunes by cheating, trickery or other deceptive devices. Above all, he was determined to prevent any part of his vast estate and fortune from ever falling into the hands of persons who were lazy, ignorant or wicked of heart.

While Willy was a prodigiously brilliant and gifted man, he was also surprisingly naive. Willy soon met his demise at the bottom of a boiling vat of chocolate via the hands of his greedy nephew and would-be heir, Ignomeous ("Iggy") Ignoramus. When Iggy learned of his uncle's plan, he abducted Willy late one night outside his office and forced him at gunpoint to reveal the secret passwords which only Willy knew (it was easy for Willy to remember because the passwords were his favorite candies). While nervously holding the gun to Willy's head, Iggy frantically inscribed the secret account numbers and passwords on the back of a chocolate bar (there being no paper handy at the time). He then bound and gagged Willy and threw him into the boiling vat of chocolate whereupon Willy was found dead the next morning.

Iggy's plan (such as it was) was to lay low and wait for Willy's estate to be liquidated and transferred into the various secret Swiss accounts in accordance with Willy's final wishes. But, before any genuinely worthy recipient would have a chance to successfully complete all of the challenges and rightfully claim the Wonkers fortunes, Iggy would secretly divert all of the funds in each of the secret Swiss accounts to his own secret accounts whereupon he would enjoy the good-life forever thereafter.

Unfortunately, Iggy failed to consider the extreme heat radiated by the boiling vat of chocolate. By the time Iggy had gagged, bound, dragged and threw Willy into the boiling vat of chocolate and watched him as he slowly sank deeper and deeper into the molten chocolate to his demise, Iggy realized he was sweating like a pig. It was at that time that he also noticed the chocolate bar—upon which he had inscribed the secret Swiss account numbers and passwords—had all but melted away in his shirt pocket. Frantically, Iggy tried to preserve the rapidly melting chocolate bar, but it was too late. He was only able to salvage a few incomplete numbers and passwords before the candy bar was no more.

Iggy tried mentally to recreate the missing information, but he was not good at remembering much of anything, let alone numbers and obscure passwords. Thus, he could only recreate a few bits and pieces of the critical information. On the brighter side, Iggy did manage to salvage some of the information and he figured, given enough time, he would probably be able to break the secret passwords and ultimately get the loot before anyone else does. His cousin, Malcolm Malcontent, and several other greedy would-be heirs agreed to help him in exchange for a cut of the loot.

Game participants are invited to a reading of the will where they are identified as a potential heir to the Wonkers family fortune. Each participant is challenged to complete the Wonkers Worldwide Worthiness test and to thereby obtain the secret Swiss account number(s)/passwords and the Wonkers fortunes before Iggy does. The first participant who successfully completes the challenge gets all the loot. However, the failure to complete any single challenge results in immediate and permanent disinheritance.

The challenges are arranged so that only those who are smart, diligent and who are pure of heart and mind (etc., etc. . . . ) will be able to successfully complete the worthiness challenge. Thus, participants must faithfully carry out and complete each challenge in the exact manner specified. Any changes or deviations will result in failure. The game is also set up to provide many temptations along the way to cut corners, cheat or trick ones way through the various challenges. Players must not succumb to these temptations, lest they be immediately and permanently disinherited. Players must also be careful not to reveal any helpful information to Iggy or his posse of greedy co-conspirators, lest they get to the loot first.

Game Play

Each game participant receives a card, token, key chain, or other gaming implement ("game token"). This token contains a unique identification number (preferably an RFID tag, mag-strip card, bar-coded card, or the like) which is used to uniquely identify each player throughout the game play. Optionally, a user-selected password is associated with each token so that it can only be used or activated by its proper owner. The token allows players to interact with one or more game enabled readers/stations and/or other compatible devices distributed throughout a selected geographic region (e.g., book stores, theme parks, family entertainment centers, movie theaters, fast-food venues, internet, arcades, etc.).

Preferably, each token represents a specific character in the treasure hunt game. Thus, play participants would preferably select which character he or she would like to play. For example, possible characters may include Eddy the Electrician, Abe the Accountant, Martha the Musician, Doctor Dave, Nurse Betty, Policeman Paul, etc. Each character would come with a unique story about who they are, how they were related to Willy and, most importantly, a touching little vignette about Willy that no one else knows. Hidden within each story is one or more unique clues that are necessary to solve the various challenges the players will soon face. The game is preferably arranged and set up so that clues can only be successfully used by the particular character(s) who legitimately possesses them. If any other character illegitimately obtains these secret clues and tries to use them in the game, he or she will fail the challenge.

Preferably all of the clues (and possibly other, extrinsic clues) are required to complete the quest. Thus, players will preferably need to cooperate with other players in order to receive and exchange clues and/or other specified assistance "legitimately" to enable each player to advance in the game. For example, assume that Policeman Paul knows that Willy detests white chocolate. Nurse Betty knows that Willy can't stand licorice. In the course of game play, Betty and Paul independently determine that one of the secret passwords must be either: (1) Jelly Bean; (2) White Chocolate; or (3) Licorice. Neither Betty nor Paul, alone, knows the correct answer (they can try to "trick" the game by guessing, but then they will lose the quest). But, together they can solve the challenge. Betty can share her information with Paul and Paul can share his information with Betty.

Preferably, any sharing of information must be conducted within the rules of the game to be "legitimate" and recognized by the game. Thus, preferably, players cannot advance in the game simply by getting the relevant clue info from the internet or by asking other players. To be legitimate and, therefore, recognized by the game, both players of the Betty and Paul characters must present their tokens together to an enabled token reader (e.g., at a local game center or theme park) and request that the information be shared between the characters. Once the information is legitimately exchanged within the context of the game, it then can be used by each player/character to solve further challenges and to thereby advance in the game. However, if a player guesses the answer (even correctly) or if the clue information is obtained illegitimately, then the player preferably loses the quest and must purchase a new token.

More complex sharing scenarios could also be developed. For example, certain unique clue information could be revealed only during the course of game play and only to certain characters. Other characters would need this clue information to advance in the game and would have to figure out which other character(s) have the information they need. They would then need to find and contact another player (a friend, acquaintance, classmate, etc.) who has the appropriate character token and who has successfully found the clue information they need. Then they would need to meet in order to make the necessary exchange transaction.

For instance, assume in the above example that Paul had information to help Betty, but Betty did not have the information needed to help Paul. Betty had information to help Martha and Martha had the information to help Paul. Now, the players must somehow negotiate a mutual three-way exchange that works for everyone's interest. The resulting transactions could be simple bartering (information in exchange for information/help) and/or there could be some kind of currency involved, such as bonus points or the like, whereby players could negotiate and accumulate points each time they help other players. One goal of the game is to encourage playful interaction among the players by requiring them to work with (and possibly negotiate against) other players to see who can get the information and points they need to advance in the game.

Alternatively, players may need to acquire or learn some special skill or knowledge that is necessary to interpret a clue. For example, one player may get a clue in a strange foreign language and another player happens to be (or chooses to become within the context of the game) an international language expert who can interpret the foreign-language clue. Both players need to somehow find and cooperate with one another in order to advance in the game. Players can (and preferably must) also obtain certain information or clues from other extrinsic sources in order to further advance in the game. These can be simple extrinsic sources like a dictionary, encyclopedia, a local library or museum, or a secret code word printed on a participating retail store purchase receipt.

Preferably, the game is self-policing. That is, it "knows" when an exchange of information and/or other help is legitimately given (i.e. conducted within the rules of the game) and can react accordingly. For example, the game may require both players (or multiple players, if more than two are involved) to simultaneously present their tokens to an enabled reader/device. The reader would then be able to verify the identities of each character/player, extract relevant info, token ID, user password, etc., and write the relevant new info to each player's token. Once the transaction is completed, each player would then legitimately possess and be able to use the information stored on his/her token to advance further in the game using any other gaming device that can read the token.

Alternatively, the same sequence can be followed as described above, except that the token is used only to verify character and player identities (e.g. an RFID read only tag). All other relevant information is stored in a local and/or central database. The data-base keeps track of each individual player's progress, what information/clues they have learned, who they have interacted with, points accumulated, etc. Thus, game play can proceed on any device that can communicate via the internet, such as a home computer, game console, internet appliance, etc.

Alternatively, an authenticating password may be used in conjunction with each RFID identifying token. When two or more players present their tokens to an enabled reader device as in the examples described above, each player is given an authenticating password, which the player(s) then can enter into any other gaming platform. The password may be an alpha-numeric code that is mathematically derived from the unique ID numbers of each participating player involved in the sharing transaction. Thus, it is unique to the specific players involved in the authorized exchange transaction and cannot be used by other players (even if they copy or steal the password). When the alpha-numeric number is subsequently re-entered into another device (e.g., a home game console or home computer) by the authorized player, the game software can reverse the mathematical algorithm using the players unique ID (previously entered at the beginning of the game) and thereby determine and/or validate the event(s) that generated the authenticating password. Existing public-key/private-key encryption algorithms and/or the like could be used for encoding and decoding the authenticating passwords. Optionally, each authenticating password could have a "shelf life" of any desired length of time such that it must be used within an hour, a day, a week, a month, etc. This might help move the game along by keeping players on their toes. Authenticating passwords could be easily printed and dispensed on special tickets or stickers, which can be collected. Alternatively, and/or in addition, authenticating passwords can be readily printed on any ordinary cash register receipt as part of any purchase transaction (e.g. at a fast food or other retail establishment).

The treasure hunt game may be continual in its progression or it may be orchestrated in "real time" via the internet or any other mass distribution/communication medium, such as TV commercials, mini-gameboy installments, computer-animated MPEG videos. For example, each game might last several days/weeks/months, and may be launched in conjunction with a promotional/advertising campaign for a complementing movie or the like. In that event, players would preferably sign up in advance to receive their tokens to play the game or they can purchase one or more tokens at any participating gaming outlet before or during the game.

Of course, those skilled in the art will readily appreciate that the underlying concept of an RFID trading card 400 and card game is not limited to cards depicting fantasy characters or objects, but may be implemented in a wide variety of alternative embodiments, including sporting cards, baseball, football and hockey cards, movie character cards, dinosaur cards, educational cards and the like. If desired, any number of other suitable collectible/tradable tokens or trinkets may also be provided with a similar RFID tag device in accordance with the teachings of the present invention as dictated by consumer tastes and market demand.

EXAMPLE 4

Game participants are immersed in a "whodunit" murder mystery. For example, this interactive adventure game could be based on the popular board game "CLUE™." Players learn that a murder has been committed and they must figure out who did it, in what room, with what weapon, etc. The game is preferably live-action interactive with simulated live-newscasts, letters, telephone calls, etc.

Sample Storyline

Major Mayonnaise is found dead in his palatial mansion of an apparent massive coronary. However, clues at the crime scene indicate that this was in fact a carefully planned murder. Based on the indisputable physical evidence, the murder could only have been committed by one of eight possible suspects.

It is common knowledge that each player hated Mayonnaise and, thus, each player has been identified as a suspect in the murder. Thus, the mission is to figure out WHO DUNIT! and how.

Game Play

Game play is essentially as described above in connection with Example 3. Players receive game tokens, cards, bands or the like uniquely identifying each player. Preferably, each token represents one of the eight suspect characters in the Whodunit game. As in Example 3, above, each character would preferably have a unique story about who they are, where they were on the night of the murder, and why they dislike Mayonnaise. Hidden within the collective stories are the unique clues necessary to solve the murder mystery challenge. Players cooperate by exchanging clues and other information needed to solve the mystery. As in Example 3, the game is preferably set up and organized so that relevant clues can only be successfully used by the particular character(s) who legitimately possess them. Any player who tries to cheat will preferably be disqualified or otherwise prevented from advancing in the game.

EXAMPLE 5

Game participants are immersed in a magical computer adventure game. For example, this interactive adventure game could be based on the popular "HARRY POTTER™" series of children's books by J. K. Rowling and licensed computer games by Electronic Arts. Players learn basic magic skills as they progress through an adventure game and solve one or more challenges/puzzles.

Sample Storyline

Players are students enrolled at the Hogwart school of witchery where they are learning witchcraft, spell casting, secret messaging and the like. But something terrible and evil has happened and it is up to each player and their fellow classmates to solve the mystery and ferret out the evil-doer and save the school.

Game Play

Game play is essentially as described above in connection with Examples 3 and 4. Players preferably receive game tokens, cards, bands and/or the like uniquely identifying each player. Each token provides a unique identifier for the player and preferably can store his/her progress in the game. Each player begins the adventure with essentially the same magic powers, skills and abilities. Each player may also receive a magic wand or other similar device which the players mush learn to use to accomplish certain goals set out in the game.

Players cooperate by exchanging clues and other information needed to solve the mystery. As in Examples 3 and 4, the game is preferably organized so that relevant clues can only be successfully used by the particular character(s) who legitimately possess them. Any player who tries to cheat will preferably be disqualified or otherwise prevented from advancing in the game.

An authenticating password system is preferably used to verify or authenticate game events and to thereby discourage cheating. These secret codes or pass words may be obtained from any participating game venue (e.g., fast food venues, toy store, theme parks, etc.) or other sources that will become obvious once the game is implemented. Once a secret password is obtained, players can enter it into a specially enabled home computer game, arcade game, portable gaming device, or other device, to get secret powers and/or to find secret parts of the game otherwise unobtainable without the secret code. For example, a player may buy a meal from a fast-food vendor and as part of the meal package would receive a token and/or a secret code. The secret code preferably may be used to access a secret portion or level of a popular computer adventure game.

Most preferably (although not required) authenticating passwords are unique or semi-unique to the player(s) who possess them. For example, each password may be an alpha-numeric code that is mathematically derived from a unique ID number stored on each participating players token or from a password the player selects. Thus, the secret code is more-or-less unique to the specific player(s) involved in an authenticated game event and preferably cannot be used by other players (even if they copy or steal the secret code). When the alpha-numeric number is subsequently re-entered into another device (e.g., a home game console or home computer) by the authorized player, the game software can reverse the mathematical algorithm using the players unique ID or user-selected password (this may or may not be previously entered at the beginning of the game) and thereby determine and/or validate the game event(s) that generated the authenticating password. Existing public-key/private-key encryption algorithms and/or the like could be used for encoding and decoding the authenticating passwords.

Optionally, each authenticating password could have a "shelf life" of any desired length of time such that it must be used within an hour, a day, a week, a month, etc. This might help move the game along by keeping players on their toes. Authenticating passwords could be easily printed and dispensed on special tickets or stickers, which can be collected. Alternatively, and/or in addition, authenticating passwords can be readily printed on any ordinary cash register receipt as part of any purchase transaction (e.g. at a fast food or other retail establishment).

To make the password system more convenient, the token device may optionally include one or more entry buttons and an LCD display. When players insert the token into an enabled reader, the secret code(s) are downloaded automatically to the token device and can be displayed on the LCD screen. The token thus becomes a secret encoder/decoder device that allows players to electronically transport and send/receive secret messages and codes to each other that can only be read by players/devices that possess the correct authenticating code. An optional communication port may allow secret codes to be downloaded directly to a computer game, portable game unit or other devices using, for example, a standard USB communication port.

Retail Methods

The above-described games additionally allow for unique methods for providing a retail product to a consumer. In particular, such methods include selling a retail product, advertising the retail product, combinations of the same and the like. In general, the retail methods disclosed herein allow a consumer to purchase a product that is capable of interacting, such as through wireless communication, with a variety of devices and/or in a variety of venues. In addition, in certain embodiments, the consumer is able to "feel-out" the product by using the product for a certain period of time prior to purchasing the product. For instance, the consumer may use the retail product to participate in an interactive game, after which he/she has the option of purchasing the product as a souvenir and/or, preferably, of using the product in subsequent games and/or venues.

Furthermore, unlike magnetically-stripped cards used in certain entertainment centers to keep track of a consumer's account balance (for example, play credits) and/or awards (for example, number of tickets earned), the retail products described herein may be used in a variety of venues and/or may have an independent use or value, as described in more detail below. That is, embodiments of the retail product allow a consumer to use the product in a variety of interactive venues, while the retail product also has a separate utility or value outside the venues.

As disclosed previously herein, certain embodiments of the invention include a retail product, such as a toy device, that is provided to a consumer for interactive use in one or more venues. For exemplary purposes, the retail product will be generally referred to hereafter as a toy wand. It is contemplated, however, that the retail product may take on a variety of different forms and/or uses, examples of which are disclosed below.

Figure 24:
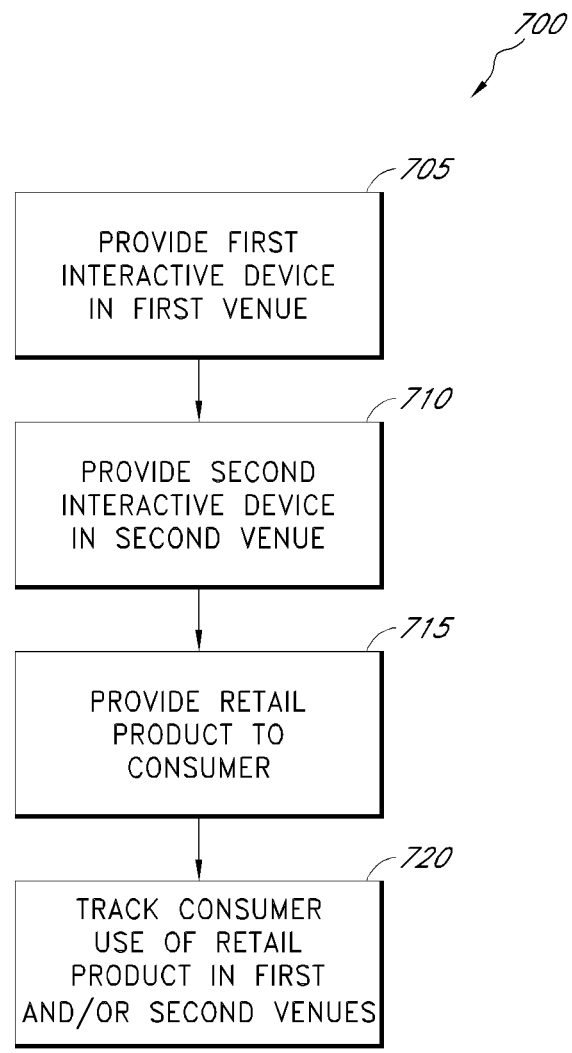
FIG. 24 illustrates a flowchart of an exemplary embodiment of a retail process of providing an interactive device for use in multiple interactive venues.

FIG. 24 illustrates an embodiment of a retail process 700 wherein a consumer is able to use a toy wand in a variety of venues. As shown, the retail process 700 begins with Block 705, wherein a first interactive device is provided in a first venue. In certain embodiments, the first interactive device is capable of producing one or more sensory, or physical, effects in response to communication to and/or from the toy wand. For instance, the first interactive device may be capable of controlling one or more play effects as described above. In certain embodiments, the first interactive device is capable of activating a light and/or sound, controlling an animated character, providing the consumer with clues to complete a challenge, providing the consumer with coupons and/or discounts, decoding riddles, providing the consumer with certain information, upgrading and/or enhancing the consumer's play experience, combinations of the same, or the like.

In certain embodiments, the first interactive device comprises an RF device, such as an RF reader and/or transceiver. In other embodiments, the first interactive device may comprise a receiver (for example, an infrared receiver), a detector, a scanner, and/or other like devices capable of communication with an external device.

At Block 710, a second interactive device is provided in a second venue. In certain embodiments, the second interactive device is also capable of producing one or more sensory effects in response to communication to and/or from the toy wand. For example, the second interactive device may be similar to the first interactive device. In yet other embodiments, the second interactive device may differ from the first interactive device.

In certain embodiments of the invention, the first and/or second venues may comprise one or more of a wide variety of facilities, locations, and/or structures. For example, one or more of the venues may comprise an interactive entertainment facility, embodiments of which are described above. In certain other embodiments, the venue(s) may comprise an amusement park, an arcade, a family entertainment center, a dentist's office, a doctor's office, an automobile, a bus, a taxi, a sports arena or field, a post office, an airplane, a store, a restaurant, a conference center, a hotel, a television set, a personal computer, a billboard, the Internet, combinations of the same, or the like.

In certain embodiments, the first venue identified in Block 705 is geographically separate from the second venue identified in Block 710. That is, the first and second venues are advantageously positioned in different locations, such as for example, different cities and/or neighborhoods.

At Block 715, the consumer is provided with the toy wand, which is capable of interfacing with the first and second interactive devices. As will be appreciated, in other embodiments, the consumer may be provided with an interactive toy or product other than a wand, such as, for example, a stuffed animal, a toy vehicle, a lunchbox, or the like. In yet other embodiments, the retail product comprises apparel (such as clothing, a hat, a backpack, shoes, or the like), jewelry (such as a necklace, a bracelet, a watch, or glasses, or the like), a collector's item (such as a card or badge), combinations of the same or the like.

Advantageously, the toy wand is of a size that may be easily transported by the consumer. In embodiments of the invention involving other types of retail products, the consumer may wear the retail product and/or attach the retail product to his/her clothing.

Furthermore, in certain preferred embodiments, the toy wand is capable of wireless communication with the first and second interactive devices. For instance, in certain embodiments, the toy wand may comprise an RF tag, such as a passive (batteryless) or an active RF tag, configured to interface with the interactive devices through RF communications, as described in more detail above. In yet other embodiments, the toy wand is configured to communicate with the first and/or second interactive devices through infrared or other wireless communications.

In certain embodiments of the invention, the retail product, such as the toy wand, advantageously comprises an object having an independent and/or intrinsic value that is separate from the use of the product in the first and second venues. For instance, the retail product may comprise a "play" value such that the consumer is able to play with the retail object as a stand-alone toy. For example, the retail object may be a stuffed animal that the consumer may play and interact with outside the first and second venues. In yet other embodiments, the retail product may comprise an independent collectible value (for example, a collector card), an independent utilitarian value (for example, a shirt), and/or an independent artistic value (for example, a figurine).

With continued reference to Block 715, providing the toy wand to the consumer may comprise loaning, renting, giving and/or selling the toy wand to the consumer. In certain embodiments, the consumer may be loaned or rented the toy wand for a period of time prior to receiving an offer to sell the toy wand, which is described in more detail below with respect to FIG. 25.

After the toy wand is provided to the consumer, the retail process 700 moves to Block 720. At Block 720, the retail process 700 tracks the consumer's use of the toy wand in the first and/or second venues. Such tracking may be performed in a variety of ways. For example, in preferred embodiments, the tracking comprises electronic tracking, such as through the use of one or more computers and/or databases.

For instance, a main computer may be used to store information relating to the consumer's use of the toy wand in the first and/or second venues. Such information may include the number of interactive devices visited by the consumer, challenges completed by the consumer, the types and/or number of "spells" cast by the consumer, the progress of the consumer in one or more interactive games, combinations of the same, or the like. In such embodiments, the main computer may be networked to a plurality of computerized devices that are associated with each interactive device. In yet other embodiments, the main computer may comprise multiple computers, and/or each venue may include its own computer that may or may not be networked to computers of other venues.

In such embodiments, the toy wand is advantageously capable of storing identification information, such as information that uniquely identifies the particular consumer or group of consumers. Such types of identification information are disclosed in more detail above and may be stored, for example, on a memory of the toy wand.

In other embodiments, the toy wand stores information regarding the use of the wand by the consumer. For instance, the toy wand may store information relating to interactive devices visited by the consumer, challenges completed by the consumer, the types and/or number of "spells" cast by the consumer, the progress of the consumer in one or more interactive games, combinations of the same, or the like. In such embodiments, the toy wand preferably comprises a memory and may communicate or upload such information to a main computer or like device.

Such tracking information may be advantageously used to analyze the consumer's use of the toy wand and/or to monitor a progress of the consumer. For instance, information gathered with respect to the consumer's use of the toy wand in the first venue may be used to customize and/or enhance the consumer's experience in the second venue or in a subsequent visit by the consumer to the first venue. For example, tracking a consumer's progress in a first interactive game in the first venue may be used to determine a "reward" obtainable by the consumer in the second venue. In yet other embodiments, such tracking may be used to analyze behavioral characteristics of the consumer and/or patterns of use of the toy wand. Information gathered from such an analysis may be subsequently used to customize the consumer's play experience as he or she interacts with particular interactive devices. For example, tracking may be used to monitor in which environments (for example, locations such as particular restaurants or stores) the consumer uses the wand.

As disclosed, the retail process 700 provides for use of the toy wand in a wide variety of venues. For instance, the consumer may use the toy wand to participate in the interactive game (the first venue) and then later use his/her toy wand in a restaurant (second venue) to obtain a coupon. In yet other embodiments, the effect the consumer experiences in the second venue may depend on his/her prior experience in the first and/or other venues. With respect to the foregoing example, for instance, the value and/or type of coupon received by the consumer in the second venue may depend, at least in part, on the consumer's progress in the interactive game in the first venue, or, alternatively, the consumer may receive a coupon from an interactive device in the first venue that may be used in the second venue.

The retail process 700 described herein is not limited to any particular sequence, and the blocks or states relating thereto can be performed in other sequences that are appropriate. For example, the toy wand may be provided to the consumer (Block 715) prior to providing the first interactive device (Block 705) and/or the second interactive device (Block 710). Furthermore, described blocks or states may be performed in an order other than that specifically disclosed, or multiple blocks or states may be combined in a single block or state.

In yet other embodiments, additional blocks may be performed by the retail process 700. For instance, the consumer may be allowed to customize the design of the toy wand prior to his/her use and/or purchase of the toy wand.

Figure 25:
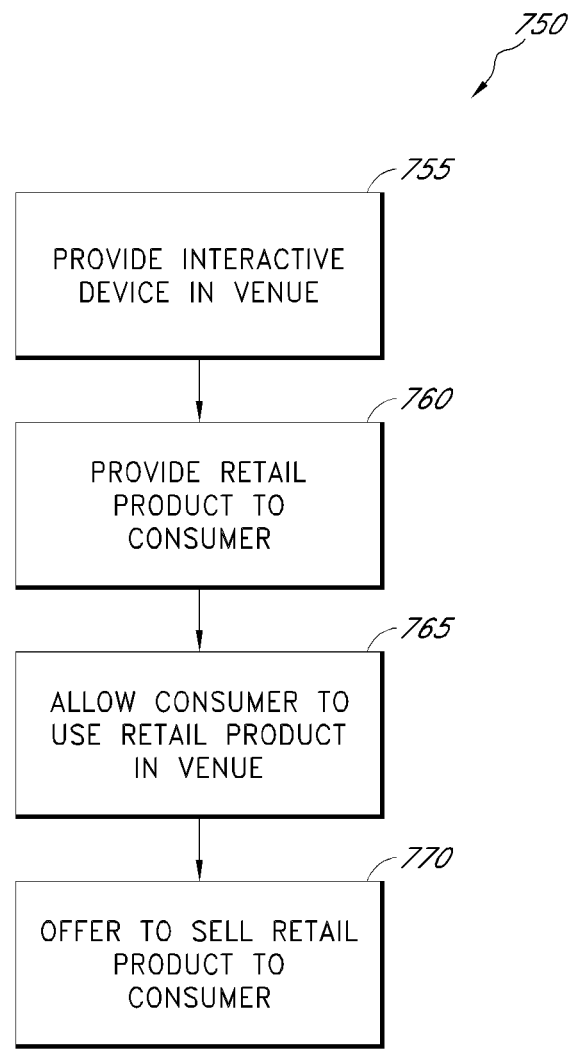
FIG. 25 illustrates a flowchart of an exemplary embodiment of a retail process for providing a consumer with an option of purchasing an interactive device after using the device in at least one venue.

FIG. 25 illustrates an example of a retail process 750 wherein a consumer has an option to purchase a retail product, such as a toy wand, after a certain period of use and/or interaction. The illustrated retail process 750 begins at Block 755 wherein an interactive device is provided in a venue. The interactive device and/or venue may comprise any of the interactive devices and/or venues described above with respect to the retail process 700 (FIG. 24).

At Block 760, the consumer is provided with the retail product, such as a toy wand. In other embodiments, the retail product may include any other of the retail products described above. In certain embodiments, in particular, the retail product advantageously comprises a product having an independent and/or intrinsic value.

In certain embodiments, the consumer is loaned or rented the toy wand for use by the consumer in the venue. As shown in Block 765, the consumer is allowed to use the toy wand in the venue for a certain period of time. For example, the consumer may be allowed to use the toy wand to interface with one or more interactive devices for a predetermined period of time, for a particular game or session, or the like.

Once the consumer has used the toy wand in the venue, the consumer is then given the option of purchasing the toy wand (Block 770). In embodiments wherein the consumer has paid money to rent the toy wand, the consumer may optionally be given an offer to purchase the toy wand at a reduced price in view of the payment(s) already made. In yet other embodiments, the consumer is able to purchase the wand after the consumer has completed or solved a particular number of games or challenges, has attained a particular progress level in an interactive game, has visited a particular number of venues and/or interactive devices, combinations of the same or the like. In yet other embodiments, the consumer may receive a particular discount on the price of the toy wand depending on his/her experience (for example, progress) in the venue.

In certain embodiments, the toy wand is offered for sale to the consumer when the consumer exits the particular venue, such as an interactive play facility. For example, a gift shop and/or other retail facility may be located near an exit of the venue. When the consumer exits the facility, he or she is given the option to either purchase or return the toy wand.

The retail process 750 advantageously provides the consumer with an opportunity to use and interact with the toy wand prior to purchase. Furthermore, it is contemplated that, once the consumer discovers the usefulness and entertainment value of the toy wand, the consumer will have an increased desire to purchase the toy wand.

Although the retail process 750 has been described with reference to particular embodiments, the blocks or states relating thereto can be performed in other sequences that are appropriate. For example, the consumer may have the option of purchasing the toy wand (Block 770) prior to using the toy wand in the venue (Block 765) and/or at any time during the consumer's participation in the venue. Details of such embodiments are discussed in copending U.S. patent application Ser. No. 11/274,760, filed Nov. 15, 2005, which is hereby incorporated herein by reference to be considered part of this specification. Furthermore, described blocks or states may be performed in an order other than that specifically disclosed, or multiple blocks or states may be combined in a single block or state.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless toy system and associated reader for enabling a game participant to access and play selected portions of an interactive game on a compatible home game console, personal computer, or hand-held game unit, said wireless toy system and associated reader comprising:

a first wireless toy comprising a first radio frequency identification (RFID) tag having non-volatile programmable memory storing a first selection of game-relevant information wherein said first wireless toy provides said game participant access to play a first portion of said interactive game;

a second wireless toy comprising a second RFID tag having non-volatile memory storing a second selection of game-relevant information and an encryption key and wherein said second selection of game-relevant information is different than said first selection of game-relevant information, wherein said second wireless toy provides said game participant access to play a second portion of said interactive game that cannot otherwise be accessed by said game participant using only said first wireless toy;

an RFID reader comprising: i) a radio frequency (RF) transceiver configured to provide two-way wireless communications with each said first and second RFID tags over a wireless communication range of less than 60 cm and to thereby ascertain said first and second selections of game-relevant information and said encryption key; and ii) a communication interface configured to enable said RFID reader to communicate with said compatible home game console, personal computer, or hand-held game unit;

and wherein said second selection of game-relevant information comprises at least one access code comprising encrypted information and wherein, after said access code is decrypted or authenticated using said encryption key, said game participant is provided access to play said second portion of said interactive game.

2. The wireless toy system and associated reader of claim 1, wherein said first wireless toy comprises a body having an internal cavity and wherein said first RFID tag is disposed within said internal cavity.

3. The wireless toy system and associated reader of claim 1, wherein said first or second wireless toy comprises a game token depicting or representing a person, character or object relevant to said interactive game.

4. The wireless toy system and associated reader of claim 1, wherein said encrypted information is decrypted or authenticated using a public-key/private-key encryption algorithm.

5. The wireless toy system and associated reader of claim 1, wherein said second RFID tag comprises a passive RFID tag and wherein said RFID reader wirelessly powers and communicates with said second RFID tag through inductive coupling over a communication range of less than 10 cm.

6. The wireless toy system and associated reader of claim 1, wherein said RFID reader further comprises a control module, and wherein said control module selectively activates an associated lighting effect or sound effect based at least in part on information wirelessly communicated by said first or second RFID tag to said RFID reader.

7. The wireless toy system and associated reader of claim 1, wherein at least said second wireless toy comprises a printed access code, and wherein said printed access code provides said game participant access to said second portion of said interactive game upon entering said printed access code into said compatible home game console, personal computer, or hand-held game unit.

8. A method utilizing one or more wireless toys for controlling access to selected portions or features of an interactive game played by a game participant on a compatible gaming device, said method comprising:
configuring said compatible gaming device to carry out said interactive game, wherein said interactive game comprises a main game portion configured to be accessed and played by said game participant using said compatible gaming device, and one or more additional game portions or features accessed by said game participant using said compatible gaming device in combination with said one or more wireless toys;
providing a radio frequency identification (RFID) reader, wherein said RFID reader provides two-way wireless communications with one or more compatible RFID tags over a wireless communication range of less than 60 cm;
configuring said RFID reader to communicate to said compatible gaming device selected game-relevant information, wherein said game-relevant information provides said compatible gaming device access to said one or more additional game portions or features;
providing a first RFID-tagged toy comprising a first RFID tag having non-volatile memory storing a first selection of game-relevant information, said first selection of game-relevant information comprising an encryption-protected first access code and wherein, after decrypted or authenticated using a first encryption key uniquely associated with said first RFID-tagged toy, said first access code provides said game participant access to a first one of said additional game portions or features of said interactive game; and
using said first RFID-tagged toy to access said first additional game portion or feature by bringing said first RFID-tagged toy within said wireless communication range of said RFID reader and thereby causing said first access code to be ascertained and communicated to said compatible gaming device.

9. The method of claim 8, wherein configuring said compatible gaming device comprises configuring a home game console, personal computer, or hand-held game unit to carry out a computer-animated game played by said game participant within a computer-generated play environment and wherein said game participant controls or directs said computer-animated game using a game controller.

10. The method of claim 9, wherein providing said RFID reader comprises providing an RFID-enabled game controller.

11. The method of claim 8, wherein said RFID reader comprises a control module to activate an associated lighting effect after said one or more compatible RFID tags is brought within said wireless communication range of said RFID reader, and further comprising using said first RFID-tagged toy to activate said associated lighting effect by bringing said first RFID-tagged toy within said wireless communication range of said RFID reader.

12. The method of claim 8, wherein said first encryption key is stored within said non-volatile memory of said first RFID tag, and wherein using said first RFID-tagged toy comprises causing said RFID reader to ascertain both said first selection of game relevant information and said encryption key from said first RFID tag and use said first encryption key to decrypt or authenticate said first access code.

13. The method of claim 8, further comprising:
i) providing a second RFID-tagged toy comprising a second RFID tag having non-volatile memory storing a second selection of game-relevant information, said second selection of game-relevant information comprising an encryption-protected second access code and wherein, after decrypted or authenticated using a second encryption key uniquely associated with said second RFID-tagged toy, said second access code provides said game participant access to a second one of said additional game portions or features of said interactive game, and ii) using said second RFID-tagged toy to access said second additional game portion or feature by bringing said second RFID-tagged toy within said wireless communication range of said RFID reader and thereby causing said second access code to be ascertained and communicated to said compatible gaming device.

14. The method of claim 13, further comprising using both said first and second RFID-tagged toys to access a third one of said additional game portions or features by bringing both said first and second RFID-tagged toys within said wireless communication range of said RFID reader and thereby causing said first and second access codes to be ascertained and communicated to said compatible gaming device.

15. A wireless toy for use by a game participant in combination with a wireless-compatible gaming platform for selectively accessing one or more portions or features of an interactive game, said wireless-compatible gaming platform comprising a radio frequency identification (RFID) tag read to wirelessly power and provide two-way wireless communications with one or more compatible RFID tags over a limited wireless communication range of less than 60 cm, said wireless toy comprising:
a first portable body comprising an internal cavity;
a first RFID tag disposed within said internal cavity, said first RFID tag comprising: i) an antenna and ii) non-volatile memory storing a first selection of game-relevant information which provides said game participant access to a first one of said one or more portions or features of said interactive game wherein after said first portable body is selectively positioned by said game participant within said limited wireless communication range of said RFID tag reader, said first RFID tag is wirelessly energized by said RFID tag reader by inductive coupling for wirelessly powering said first RFID tag;

said first selection of game-relevant information comprising a first encryption-protected item of information to be decrypted or authenticated using an encryption key, and wherein, after decrypted or authenticated, said first encryption-protected item of information provides said game participant access to said first portion or feature of said interactive game; and said first selection of game-relevant information further comprising a first encryption key, wherein said first encryption key causes said wireless-compatible gaming platform to decrypt or authenticate said first encryption-protected item of information and to control access to said first portion or feature of said interactive game based at least in part on said first encryption-protected item of information.

16. The wireless toy of claim 15, wherein said first portable body comprises a gaming item depicting or representing a person, character or object relevant to said interactive game.

17. The wireless toy of claim 15, wherein said first encryption-protected item of information is decrypted or authenticated using a public-key/private-key encryption algorithm.

18. The wireless toy of claim 15, wherein said first encryption key is uniquely associated with said wireless toy.

19. The wireless toy of claim 15, further comprising a printed access code, wherein, in response to entering said printed access code into a compatible home game console, personal computer or hand-held name unit said printed access code provides said game participant access to said first portion or feature of said interactive game.

20. The wireless toy of claim 15, further comprising a second portable body comprising a second RFID tag comprising non-volatile memory storing a second selection of game-relevant information which provides said game participant access to a second one of said one or more portions or features of said interactive game, said second selection of game-relevant information comprising: i) a second encryption-protected item of information, and wherein, after decrypted or authenticated using an encryption key, said second encryption-protected item of information provides said game participant access to said second portion or feature of said interactive game, and ii) a second encryption key which causes said wireless-compatible gaming platform to decrypt or authenticate said second encryption-protected item of information and to thereby control access to said second portion or feature of said interactive game.

* * * * *